(12) United States Patent
Yurchenko

(10) Patent No.: US 10,894,868 B2
(45) Date of Patent: *Jan. 19, 2021

(54) COMPOSITE CARBON FIBERS

(71) Applicant: Hexcel Corporation, Dublin, CA (US)

(72) Inventor: Michael E. Yurchenko, Decatur, AL (US)

(73) Assignee: Hexcel Corporation, Dublin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/850,790

(22) Filed: Dec. 21, 2017

(65) Prior Publication Data

US 2019/0194405 A1    Jun. 27, 2019

(51) Int. Cl.

| | | |
|---|---|---|
| C08J 5/04 | (2006.01) |
| C08J 5/06 | (2006.01) |
| C25D 9/02 | (2006.01) |
| D01F 11/14 | (2006.01) |
| D01F 11/16 | (2006.01) |
| D06M 10/10 | (2006.01) |
| D06M 14/36 | (2006.01) |
| D06M 15/53 | (2006.01) |
| D06M 15/59 | (2006.01) |
| D06M 15/61 | (2006.01) |
| D06M 15/63 | (2006.01) |
| D06M 15/693 | (2006.01) |
| D06M 101/40 | (2006.01) |

(52) U.S. Cl.
CPC ............. *C08J 5/06* (2013.01); *C08J 5/042* (2013.01); *C25D 9/02* (2013.01); *D06M 10/10* (2013.01); *D06M 14/36* (2013.01); *D06M 15/53* (2013.01); *D06M 15/59* (2013.01); *D06M 15/61* (2013.01); *D06M 15/63* (2013.01); *D06M 15/693* (2013.01); *C08J 2347/00* (2013.01); *C08J 2377/08* (2013.01); *C08J 2377/12* (2013.01); *C08J 2379/02* (2013.01); *C08J 2379/08* (2013.01); *C08J 2381/06* (2013.01); *D01F 11/14* (2013.01); *D01F 11/16* (2013.01); *D06M 2101/40* (2013.01); *D06M 2200/40* (2013.01); *D06M 2400/01* (2013.01)

(58) Field of Classification Search
CPC ...... C08J 5/06; C08J 2347/00; C08J 2381/06; C08J 2379/08; C08J 5/042; C08J 2377/12; C08J 2379/02; C08J 2377/08; C25D 9/02; D06M 14/36; D06M 15/59; D06M 15/693; D06M 15/53; D06M 15/61; D06M 15/63; D06M 2101/40; D06M 10/10; D06M 2200/40; D06M 2400/01; D01F 11/16; D01F 11/14

See application file for complete search history.

(56) References Cited

U.S. PATENT DOCUMENTS

| | | |
|---|---|---|
| 3,776,829 A | 12/1973 | Goan |
| 4,690,738 A | 9/1987 | Desarmot et al. |
| 4,844,781 A | 7/1989 | Sanchez et al. |
| 5,298,576 A | 3/1994 | Sumida et al. |
| 6,894,113 B2 | 5/2005 | Court et al. |
| 7,959,783 B2 | 6/2011 | Byrd et al. |
| 8,404,339 B2 | 3/2013 | Wang |
| 9,103,047 B2 | 8/2015 | Byrd et al. |
| 2002/0144912 A1 | 10/2002 | Fagebaume et al. |
| 2008/0251203 A1 | 10/2008 | Lutz et al. |
| 2012/0076711 A1 | 3/2012 | Gebald et al. |
| 2013/0224470 A1 | 8/2013 | Vautard et al. |
| 2018/0023244 A1* | 1/2018 | Yurchenko .............. D01F 11/14 |

FOREIGN PATENT DOCUMENTS

| | | |
|---|---|---|
| CN | 104195835 A | 12/2014 |
| EP | 163 2533 A1 | 3/2006 |
| EP | 212 3711 A | 11/2009 |
| EP | 213 5909 A1 | 12/2009 |
| EP | 225 6163 A1 | 12/2010 |
| JP | 2002 121295 A | 4/2002 |
| KR | 101 597 213 B1 | 2/2016 |
| WO | WO 2004/035675 A1 | 4/2004 |
| WO | WO 2014/096435 A2 | 6/2014 |
| WO | WO 2018/015883 A1 | 1/2018 |

OTHER PUBLICATIONS

International Search Report and Written Opinion for Application No. PCT/IB2018/060286 dated Mar. 25, 2019, 14 pages.
Kumru et al., *Electrografting of tiophene, carbazole, pyrole and their copolymers onto carbon fibers: electrokinetic measurement, surface composition and morphology*, Synthetic Metals 123 (2001) 391-402.
International Search Report and Written Opinion for Application No. PCT/IB2017/054336 dated Oct. 24, 2017, 15 pages.
Barbier, B. et al., *Electrochemical Bonding of Amines to Carbon Fiber Surfaces Toward improved Carbon-Epoxy Composites*, J. Electrochem. Soc., vol. 137, No. 67 (Jun. 1990) 1757-1764.
Belanger, D. et al., *Electrografting: A Powerful Method for Surface Modification*, J. Chem. Soc. Rev., 2011, 40, 3995-4048.
Buttry, D. A. et al., *Immobilization of Amines at Carbon Fiber Surfaces*, Carbon, 37 (1999), 1929-1949.
Chretien, J-M et al., *Covalent Tethering of Organic Functionality to the Surface of Glassy Carbon Electrodes by Using Electrochemical and Solid-Phase Synthesis Methodologies*, Chemistry—A European Journal, 14 (2008) 2548-2556.
Dodiuk-Kenig, H. et al., *Novel Adhesion Promoters Based on Hyper-Branched Polymers*, Composite Interfaces, vol. 11, No. 7 (2004) 453-469.

(Continued)

*Primary Examiner* — Patrick D Niland
(74) *Attorney, Agent, or Firm* — Alston & Bird LLP

(57) ABSTRACT

Provided is composite carbon fibers in which polymers having an amino containing group are covalently bonded to the surface of the carbon fiber. Aspects are also directed to processes for preparing the composite carbon fibers. Additional aspects are directed to reinforced composites comprising a resin matrix and the composite carbon fibers, and to processes of making such reinforced composites.

23 Claims, 6 Drawing Sheets

(56) References Cited

OTHER PUBLICATIONS

Gallardo, I. et al., *Spontaneous Attachment of Amines to Carbon and Metallic Surfaces,* Journal of Physical Chemistry B, 110 (2006) 19521-19529.
Jones, C., et al., *The Effect of Low Power Ammonia and Nitrogen Plasmas on Carbon Fibre Surfaces,* Materials Research Society Symposium Proceedings, vol. 171 (1990) 407-412.
Leonard, G. C. et al., *Modulus-Graded Interphase Modifiers in E-Glass Fiber/Thermoplastic Composites,* Journal of Adhesion Science and Technology, 23 (2009) 2031-2046.
Loh, I. H. et al., *Modification of Carbon Surfaces in Cold Plasmas,* Journal of Materials Science, 22 (1987) 2937-2947.
Nguyen, F. et al., *Use of Polyethyleneimine Dendrimer as a Novel Graded-Modulus Interphase Material in Polymeric Composites,* J. Adhesion Sci. Technol., vol. 21, No. 14 (2007) 1375-1393.
Pantano, P. et al., *Characterization of the Chemical Architecture of Carbon-Fiber Microelectrodes. 1. Carboxylates,* Analytical Chemistry, 63 (1991) 1413-1418.
Peng, Q. et al., *Interfacial Enhancement of Carbon Fiber Composites by Poly(amido amine) Functionalization,* Composites Science and Technology, 74 (2013) 37-42.
Pittman, C. U. et al., *Chemical Modification of Carbon Fiber Surfaces By Nitric Acid Oxidation Followed by Reaction With Tetraethylenepentamine,* Carbon, vol. 35, No. 3 (1997) 317-331.
Pittman, C. U., Jr. et al., *Reactivities of Amine Functions Grafted to Carbon Fiber Surfaces by Tetraethylenepentamine. Designing Interfacial Bonding,* Carbon, vol. 35, No. 7 (1997) 929-943.
Zhang, W. et al., *Self-Healable Interfaces Based on Thermo-Reversible Diels-Alder Reactions in Carbon Fiber Reinforced Composites,* Journal of Colloid and Interface Science, 430 (2014) 61-68.

\* cited by examiner

COMPOSITE CARBON FIBERS

FIELD

The present invention relates generally to carbon fibers for use in the preparation of fiber reinforced composites, and in particular, to a composite carbon fiber comprising a carbon fiber having a polymer electro-grafted onto a surface thereof.

BACKGROUND

Fiber reinforced composites are increasingly being used in a wide variety of applications due to their relative low weight and high strength. An example of one such application is the aviation industry where there is a desire to improve fuel efficiency by reducing vehicle weight. Fiber reinforced composite structures provide a material having a lower density than a corresponding structure comprising a metallic alloy while retaining mechanical properties comparable with steel and aluminum.

Generally, fiber reinforced composites comprise a resin matrix that is reinforced with a fibers, such as carbon fibers. The fiber reinforced composites are typically prepared in a process in which a fabric or tow comprising fibers is impregnated with the resin to form a so called prepreg. The term prepreg is commonly used to describe a reinforced composite comprising fibers that are impregnated with a resin, and that is in an uncured or partially cured state. The prepreg can then be molded into a final or semifinal molded part by subjecting the prepreg to conditions sufficient to cure the resin. Typically, curing takes place by heating the prepreg in a mold at a sufficient temperature and for a sufficient amount of time to cure the resin. Epoxy resins are commonly used in the productions of fiber reinforced composites.

Adhesion of the carbon fibers to the resin matrix is of critical importance in maintaining the mechanical strength of the part, and to prevent delamination of the fiber-carbon interface. To improve adhesion, the carbon fibers are typically treated with a surface treatment prior to impregnation with the resin. A common surface treatment method involves pulling the carbon fiber through an electrochemical or electrolytic bath that contains solutions, such as sodium hypochlorite, ammonium bicarbonate, or nitric acid. These materials etch or roughen the surface of each filament, which increases the surface area available for interfacial fiber/matrix bonding. The increase in fiber surface area helps to mechanically interlock the resin matrix to the fiber. In addition, the surface treatment may also oxidize the surface of the fibers, which results in the formation of reactive chemical groups, such as carboxylic acids, on the surface of the fibers.

There are however some disadvantages which may be associated with the surface treatment. For example, in some circumstances the surface treatment may result in undesirable deterioration of the fibers, which results in a practical limitation on how much surface treatment to which the carbon fiber may be subjected. As a result, the surface treatment may not adequately provide the desired level of reactive chemical groups on the surface of the fibers.

Accordingly, there still exists a need for improved carbon fibers and methods of preparing same.

SUMMARY

Embodiments of the invention are directed to composite carbon fibers in which polymers having an amino containing group are covalently bonded to the surface of the carbon fiber. Aspects of the invention are also directed to processes for preparing the composite carbon fibers. Additional aspects of the invention are directed to reinforced composites comprising a resin matrix and the composite carbon fibers, and to processes of making such reinforced composites.

In one embodiment, aspects of the present invention are directed to a composite carbon fiber comprising a polymer having an amino containing end group, amino containing pendant group, or amino containing main group that, when subjected to electrografting conditions, results in the formation of an amino linkage in which the amino containing group is covalently bonded to the surface of the carbon fiber.

The inventor has discovered that by electrografting amino containing polymers onto a carbon fiber surface, a fiber reinforced composite having improved fracture toughness and interlaminar properties can be prepared.

In additional aspects, the invention also provides for a carbon size comprising a composite carbon fiber in which a coating comprising a polymer having an amino containing end group or amino containing pendant group is deposited onto the surface of the carbon fiber.

BRIEF DESCRIPTION OF THE DRAWINGS

Reference will now be made to the accompanying drawing, which is not necessarily drawn to scale, and wherein.

DETAILED DESCRIPTION

Figure 1:
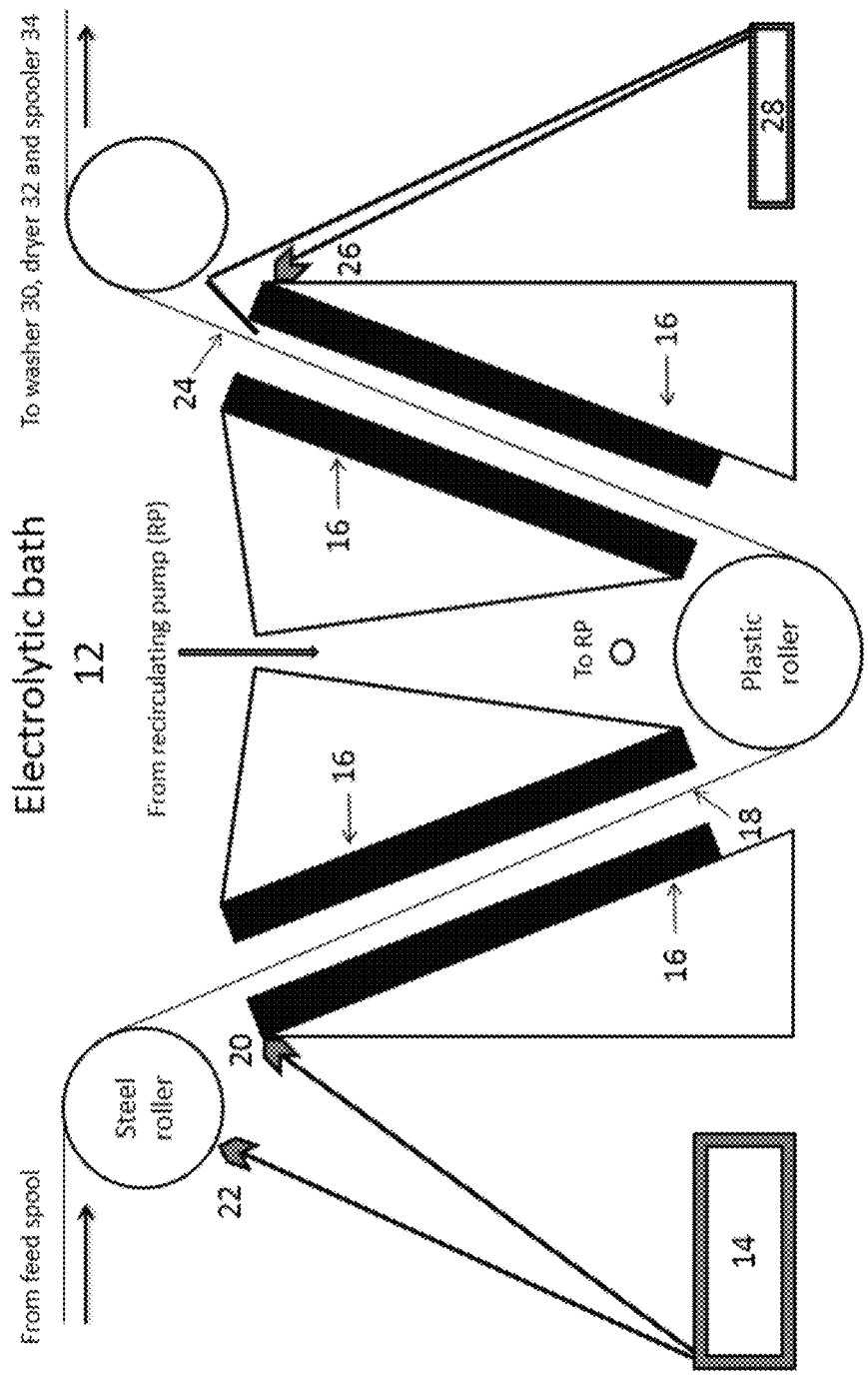
FIG. 1 is a schematic illustration of a system for electrografting an amine-functionalized polymer onto a carbon fiber.

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

The term "electrografted fiber" refers to fiber that has been subjected to electrografting conditions.

The term "electrografted polymer" refers to the polymer fraction covalently attached to the fiber surface. An electrografted polymer cannot be extracted from the polymer by simple solvent extraction. It should also be understood that when a fiber is subjected to electrografting conditions there might also exist an extractable polymer fraction that is adsorbed or otherwise weakly bound onto the surface of the carbon fiber. This polymer fraction is not covalently bound to the fiber surface and can be extracted by a simple solvent extraction. The electrografted fiber may contain either one or both of abovementioned fractions.

The term "electrodeposited polymer" refers to the overall amount of polymer present on the fiber and does not specify the mode of attachment, whether it is electrografted, adsorbed or both.

The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

Each embodiment disclosed herein is contemplated as being applicable to each of the other disclosed embodiments. All combinations and sub-combinations of the various elements described herein are within the scope of the invention.

It is understood that where a parameter range is provided, all integers within that range, and tenths and hundredths thereof, are also provided by the invention. For example, "5-10%" includes 5%, 6%, 7%, 8%, 9%, and 10%; 5.0%, 5.1%, 5.2% . . . 9.8%, 9.9%, and 10.0%; and 5.00%, 5.01%, 5.02% . . . 9.98%, 9.99%, and 10.00%.

Unless otherwise apparent from the context, the term "about" encompasses values within a standard margin of error of measurement (e.g., SEM) of a stated value or variations±0.5%, 1%, 5%, or 10% from a specified value.

In addition, fiber reinforced composites prepared from the composite carbon fibers may exhibit improved fracture toughness and interlaminar strength.

Fracture toughness generally refers to the ability of a material containing a crack to resist fracture. Fiber reinforced composites in accordance with embodiments of the present invention may exhibit increases in fracture toughness properties ranging from about 10 to 60% in comparison to a similar fiber reinforced composite in which the carbon fibers and matrix resin systems are identical with the exception that the surfaces of the carbon fibers have not been modified to include an amino containing polymer (hereinafter referred to as a "non-grafted carbon fiber"). Preferably, the fiber reinforced composites exhibit increases in fracture toughness ranging from about 10 to 55%, and more preferably, from about 30 to 55% in comparison to a composite comprising a non-grafted carbon fiber. In one embodiment, the fiber reinforced composites may exhibit increases in fracture toughness ranging from about 13 to 51% in comparison to a composite comprising a non-grafted carbon fiber. Fracture toughness was determined using $G_{1C}$ Testing in accordance with the procedures set forth in BSS7273.

In one embodiment, fiber reinforced composites in accordance with embodiments of the present invention may exhibit increases in interlaminar shear strength as measured Short Beam Shear Test (SBS) strength properties ranging from about 5 to 25% in comparison to a similar fiber reinforced composite in which the carbon fibers are identical with the exception that the surfaces of the carbon fibers have not been modified to include an amino containing polymer (hereinafter referred to as a "non-grafted carbon fiber"). Preferably, the fiber reinforced composites exhibit increases in SBS strength ranging from about 7 to 25%, and more preferably, from about 10 to 25% in comparison to a composite comprising a non-grafted carbon fiber. In one embodiment, the fiber reinforced composites may exhibit increases in SBS strength ranging from about 15 to 25% in comparison to a composite comprising a non-grafted carbon fiber.

In one embodiment, the fiber reinforced composites prepared from the composite carbon fibers exhibit an interlaminar strength that is from about 17 to 25 ksi as characterized by SBS strength, and in particular, from about 18 to 24 ksi, and more particularly, from about 20 to 22 ksi. Interlaminar shear strength was measured by Short Beam Shear Test in accordance to ASTM D2344.

Composite carbon fibers in accordance with aspects of the invention may be prepared by immersing the carbon fiber through a bath solution comprising an amino containing polymer (a polymer having an amino containing end group or amino containing pendant group). The bath may be aqueous or non-aqueous, and may include one or more electrolytes.

Examples of suitable non-aqueous solvents may include methanol, ethanol, dimethylformamide, dimethylsulfoxide, sulfolane, tetrahydrofuran, propylene carbonate, and acetonitrile, among others.

Examples of suitable electrolytes may include tetraethylammonium tetrafluoroborate, tetrabutylammonium tetrafluoroborate, tetraethylammonium hexafluorophosphate, tetrabutylammonium hexafluorophosphate, tetrabutylphosphonium hexafluorophosphate, tetraethylammonium perchlorate, tetrabutylammonium perchlorate, tetraethylammonium trifluoromethanesulfonate, tetrabutylammonium trifluoromethanesulfonate, lithium perchlorate, lithium hexafluorophosphate, lithium tetrafluoroborate, lithium triflate, lithium bis(trifluoromethanesulfonyl)-imide, and lithium bis(trifluoroethanesulfonyl)imide, among others.

The concentration of the electrolyte in the bath may range from about 0.01 to 1 M, based on the total volume of the electrolyte solution in the bath. In one embodiment, the amount of the electrolyte in the bath is from about 0.01 to 0.5 M, and in particular, from about 0.015 to 0.1 M, and more particularly, from about 0.02 to 0.05 M.

The concentration of the amino containing polymer in the bath may range from about 0.5 to 10 weight percent, based on the total weight of the bath solution. In one embodiment, the amount of the amino containing polymer in the bath solution is from about 0.5 to 5 weight percent, and in particular, from about 0.75 to 4 weight percent, and more particularly, from about 1.0 to 3.0 weight percent.

As shown in FIG. 1, a system for electro-grafting an amino containing polymer onto a carbon fiber is represented by reference character 10. The system 10 includes an electrolytic bath 12, a power source 14, a cathode 16, and a carbon fiber 18. The power source 14 is connected to the cathode(s) 16 via a lead 20, and to the carbon fiber 18 via a lead 22. The system may also include one or more TEFLON® coated pulleys over which the carbon fiber is directed. The system may also include a pump (not shown) to recirculate the bath solution. After the carbon fiber is drawn through the bath, it is directed to wash station (washer) 30 where the fiber is rinsed with deionized water. The composite fiber may then be passed through a dryer 32, and then wound on an uptake spooler 34 for later use. In some embodiments, the bath may also include a reference electrode 24 that is connected to a voltmeter (e.g., digital multimeter) 28, which in turn may be connected to a cathode 16 via lead 26.

The carbon fiber may be exposed to the bath for a period of time from about 30 seconds to 5 minutes. Advantageously, it has been discovered that the amino containing polymer may be electro-grafted onto the carbon fiber in an exposure time ranging from about 1 to 2 minutes, and in particular, about 1 minute.

The applied voltage typically ranges from about 0.1 to 10 volts with a voltage from about 0.5 to 5 volts being preferred, and from 1 to 3 volts being even more preferred.

The amount of polymer electrografted (e.g., covalently bonded) to the surface of the carbon fiber is generally from about 0.05 to 3 weight percent, based on the total weight of the composite carbon fiber. In one embodiment, the amount of polymer electrografted to the surface of the carbon fiber is from about 0.05 to 2 weight percent, and in particular, from about 0.05 to 1 weight percent, and more particularly, from about 0.1 to 0.5 weight percent, based on the total weight of the composite carbon fiber.

In one embodiment, the amino containing polymer comprises an amino containing end group or an amino containing pendant group that, when subjected to electrografting conditions, results in the formation of an amino linkage in which the amino group is covalently bonded to the surface of the carbon fiber. Unless otherwise stated, the terms "amino," "amino group," and "amino containing" refers to an amine group, or a substituent group containing an amine, and that is attached to a polymer backbone, and that is present at the end (e.g., terminus) of the polymer backbone, or is present as a pendant group of the polymer backbone. In some embodiments, the amino group is an end group that terminates the polymer backbone chain. For example, in some embodiments the amino containing polymer comprises an amino terminated polymer having an amine end group (—$NH_2$) or (—NH). Preferably, the amine group is a primary or secondary amine.

In one embodiment, the amino containing polymer only includes one or two amino end group ends that are disposed at a terminal position at end of the polymer chain. In such embodiments, the amino containing polymer does not include any amino containing pendant groups. In other embodiments, the amino containing polymer may include one or more amino containing pendant groups.

The pendant amino-group is attached to the main polymer backbone via R group, which can be either aliphatic (branched or linear, saturated or unsaturated), or aromatic, or polyoxyalkylene. The aliphatic and aromatic R group can also include heteroatoms, such as, nitrogen atoms, oxygen atoms, sulfur atoms, and phosphorous atoms, among others.

In some embodiments, the amino containing polymer only has an amino group at the end of a backbone of the polymer. For example, in some embodiments the amino containing polymer does not include any amino containing pendant groups.

In some embodiments, the amino containing polymer comprises from about 1 to 150 amino containing pendant groups, and in particular, from about 1 to 20, and more particularly, from about 1 to 10 amino containing pendant groups.

In certain embodiments, the amino containing polymer is electrografted to the surface of the carbon fiber via 1 to 100 amino linkages, and in particular, from about 1 to 20 amino linkages, and more particularly, from about 1 to 2 amino linkages. As noted above, an "amino linkage" refers to a covalent bond between the amine (e.g., —NH or —$NH_2$) of the amino containing group and the surface of the carbon fiber.

In some embodiments, the polymer may include one or more amino containing main groups in which the group is part of the main polymer backbone. In such embodiments, the amino containing group comprises an amine that is capable of forming a covalent bond with the surface of the carbon fiber-under electrografting conditions.

In one aspect of the invention, it has been found that polymeric materials that have been conventionally used as toughening agents in the preparation of fiber reinforced composites may be particularly useful in the preparation of the inventive composite carbon fibers when they are functionalized to include a terminal amino containing group and/or one or more amino containing pendant groups. The presence of the amino containing groups facilitate covalent bonding of the polymer to the surface of the carbon fiber by forming an amino linkage between moieties on the surface of the carbon fiber and the polymer backbone. Covalent bonding of the polymer chain to the carbon fiber helps to immobilize the polymer chain to the surface of the carbon fiber. The immobilization of the polymer chain creates a stable toughened interface between the carbon fiber surface and the matrix, which in turn, improves the mechanical properties of the resulting fiber reinforced composite.

Representative amine containing polymers that may be used in accordance with embodiments of the invention may include polyamides, polyetheramides, polyimides, polyamide-imides, polyetherimides, polyethersulfones, polyetherethersulfones, and diene-based rubbers.

Examples of suitable polyamides may include nylons, para-aramids, and meta-aramids in which the polymer backbone is terminated with an amino containing group, or includes an amino containing pendant group. Specific examples of polyamide polymers may include nylon 3, nylon 8, nylon 10, 11, nylon 12, nylon 6, nylon 6,6, nylon 6,10, nylon 6,12, nylon 10,10, and aramids including para-aramids and meta-aramids. Commercial examples of aramid and polyamide polymers that may be used include KEVLAR® para-aramid polymers available from DuPont; TWARON® para-aramid polymers available from Teijin Aramid; TECHNORA® para-aramid polymers available from Teijin Aramid; NOMEX® meta-aramid polymers available from DuPont; and GRILAMID TR® polyamide polymers available from EMS-Grivory.

Examples of suitable polyetheramides include polyether block amides (PEBA) that are functionalized to include a terminal or pendant amino containing group, such as an amine group. An example of a suitable polyetheramides that may be used in embodiments of the invention may include the following:

Formula (I)

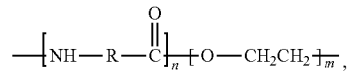

where n and m are independently a number from about 2 to 500, and in particular, from about 10 to 250, and more particularly, from about 10 to 150. Commercial examples may include VESTAMID® E available from Evonik Industries, and PEBAX® available from Arkema.

Suitable polyimides include amino terminated polyimides, or polyimides including amino containing pendant groups. Particularly, preferred polyimides include aromatic polyimides, and in particular, aromatic heterocyclic polyimides. The aromatic rings may also be polycyclic having two to four fused rings. In addition, the polyimide monomers may include one or more of alkyl, ether, ester, aryl (e.g., phenyl) groups, and combinations thereof.

An examples of a suitable polyimides that may be used in embodiments of the invention may include the following:

Formula (II)

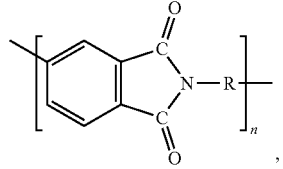

where the polymer backbone is terminated with one or more amino containing groups, contains one or more amino containing pendant groups, or a mixture thereof, R is an alkyl group ($C_1$-$C_{10}$), ether, ester, or aryl group; and n is a number from about 2 to 500, and in particular, from about 10 to 150, and more particularly, from about 10 to 30.

A further examples of a polyimide polymer that may be used in embodiments of the invention may include the following:

Formula (III)

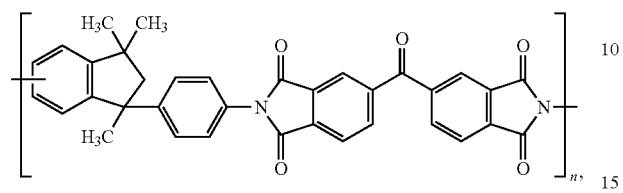

where the polymer backbone is terminated with one or more amino containing groups, contains one or more amino containing pendant groups, or a mixture thereof, and n is a number from about 2 to 500, and in particular, from about 10 to 250, and more particularly, from about 20 to 150. A commercial example of such a polyimide is MATRIMID® 5218 available from Huntsman.

Additional commercial examples may include Polyimide P84 available from Evonik, VESPEL® polyimide resins available from DuPont, LaRC®-TPI, LaRC®-IA, and LaRC®-PETI available from Langley Research Center, AVIMID K® series and AVIMID N polyimide resins available from DuPont, PMR-15, DMBZ-15, MVK-14, AFR-PE-4, and PMR-II-50 polyimide resins available from Maverick Corp, RP-46 polyimide resins available from Unitech, and EYMYD® polyimide resins available from Ethyl Corporation.

Another class of polyimide polymers that may be used in embodiments of the invention include polyetherimides. An example of a polyetherimide that may be used in embodiments of the invention may include polymers of the following formula:

Formula (IV)

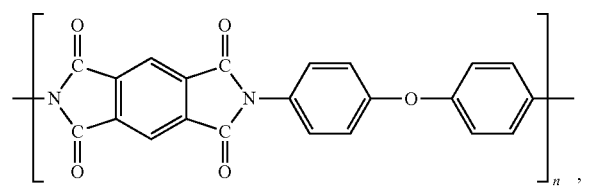

where the polymer backbone is terminated with one or more amino containing groups, contains one or more amino containing pendant groups, or a mixture thereof, and n is a number from about 2 to 500, and in particular, from about 10 to 100, and more particularly, from about 10 to 50. A commercial example of such a polyimide is KAPTON® available from DuPont.

Another example includes polyetherimides having the general formula (I) below:

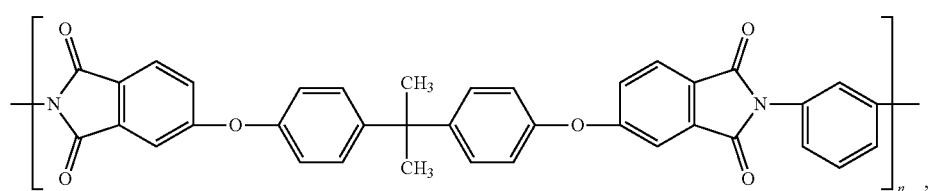

Formula (V)

where the polymer backbone is terminated with one or more amino containing groups, contains one or more amino containing pendant groups, or a mixture thereof, and n is a number from about 2 to 500, and in particular, from about 10 to 100, and more particularly, from about 10 to 50. A commercial example of such a polyetherimide is ULTEM 1000® available from Sabic. In the case of the ULTEM series of polyetherimides, the structure of the polymer is modified to include a terminal or pendant amino containing group.

Another class of polymers that may be used in embodiments of the invention include polyamide-imides having the general formula (VI) below:

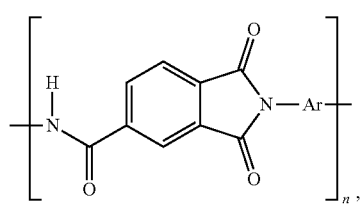

Formula (VI)

where the polymer backbone is terminated with one or more amino containing groups, contains one or more amino containing pendant groups, or a mixture thereof, and n is a number from about 2 to 500, and in particular, from about 10 to 100, and more particularly, from about 10 to 50. A commercial example of a polyamide-imide that may be used in embodiments of the present invention is TORLON®, which is available from Amoco.

A further class of amino containing polymers may include polyetherethers and polyether sulfones comprising amino terminated sulfone polymers having the general formula aryl-$SO_2$-aryl. A preferred example of the a polyether sulfone is provided by the following formula:

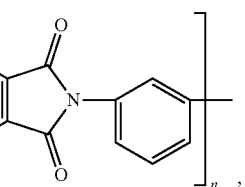

Formula (VII)

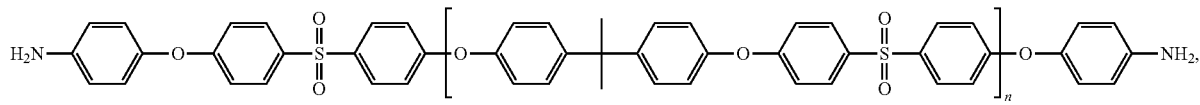

where the polymer backbone is terminated with one or more amino containing groups, contains one or more amino containing pendant groups, or a mixture thereof, and n is a number from about 2 to 500, and in particular, from about 5 to 100, and more particularly, from about 5 to 50. Commercial examples of polyether sulfones that may be used in embodiments of the present invention are A-PPS, which is available from Hexcel, and KM-177, which is available from Cytec.

A further class of polymers that may be used in embodiments of the present invention include diene rubber polymers that are amino terminated or include amino containing pendant groups. Examples of diene rubber polymers that may be used in aspects of the invention include copolymers comprising two or more monomers selected from the group consisting of butadiene, isoprene, acrylates, methacrylates, acrylonitriles, and ethylene-propylene dienes. Specific commercial examples include amine functionalized acrylonitrile butadiene rubbers available under the product name HYPRO®; acrylonitrile-butadiene-styrene (ABS); acrylonitrile-(ethylene-propylene-diene)-styrene; and acrylonitrile-styrene-acrylate (ASA).

One specific example of an acrylonitrile butadiene rubber is provided by the following formula (VIII):

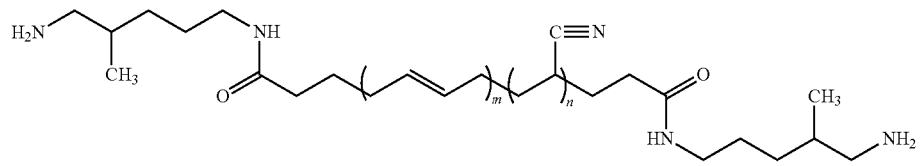

where n is a number from about 10 to 50, and m is a number from about 20 to 100. Such an acrylonitrile butadiene rubber is available from EMERALD PERFORMANCE MATERIALS under the product name HYPRO® 1300X42 ATBN.

In one aspect, embodiments of the present invention provide a composite carbon fiber comprising a carbon fiber having a fraction of the electrodeposited polymer electro-grafted (i.e., covalently bonded) onto a surface thereof via an amino linkage between the surface of the carbon fiber and an amino end group, amino pendant group, amino main chain group of the polymer. As explained in greater detail below, electrografting the polymer onto the surface of the carbon fiber results in a composite carbon fiber in which the polymer is covalently bonded to the fiber via an amino linkage between an amino containing group, such as an amino containing end group or an amino containing pendant group, of the polymer. As a result, the composite carbon fibers may be particularly useful in producing fibers reinforced composites that exhibit improved interlaminar strength.

A wide variety of different carbon fibers may be used in accordance with embodiments of the present invention. In one embodiment, the carbon fiber may be considered aerospace grade carbon and have a tensile strength of at least 400 ksi (2,758 MPa). For example, the carbon fiber may have a tensile strength of at least one of 450 ksi, 500 ksi, 550 ksi, 600 ksi, 650 ksi, 700 ksi, 750 ksi, 800 ksi, 850 ksi, 900 ksi, 950 ksi, and 1,000 ksi. In one embodiment, the carbon fiber may have a tensile strength from about 400 to 1,200 ksi, and in particular from about 600 to 1,050 ksi, and more particularly, from about 700 to 950 ksi.

Preferably, the carbon fibers are arranged in tows. The "tows" (sometimes referred to as "rovings" or simply 'fibers") are multifilament fibers. The number of filaments per tow may be, for example, 100 to 30,000. The tows should be thermally and chemically stable under conditions of prepreg formation (e.g., curing of the matrix resin composition).

Typically the fibers will have a circular or almost circular cross-section with a diameter in the range of from 0.5 to 30 microns, preferably from 2 to 20 microns, and more preferably, from 2 to 15 microns. In terms of weight, the individual tows may have a weight of, for example, 200 to 3,000 g/1000 meters, 600 to 2,000 g/1000 meters, or 750 to 1750 g/1000 meters. In a preferred embodiment, the individual tow may have a weight that is from 200 to 500 g/1,000 meters.

In some embodiments, the carbon fibers may be surface treated prior to electro-grafting the amine-functionalized polymer onto the fibers. In other embodiments, the carbon fibers may be untreated prior to electro-grafting. Preferably, the carbon fibers are not subjected to any treatment prior to electro-grafting that would reduce the tensile strength of the fibers. For example, in various embodiments the carbon fibers are not subjected to a high temperature treatment in a steam atmosphere, such as at a temperature above 800° C., or a plasma treatment.

In some embodiments, it may be desirable that the fiber is not sized or at least de-sized prior to attachment of the amine-functionalized polymer to the carbon fiber. In one embodiment, composite carbon fiber may be used as either sized or unsized by formulations known to the ones skilled in art, depending on application.

Examples of suitable carbon fibers include HEXTOW® AS-4, AS-4D, AS-7, IM-7, IM-8, IM-9, and IM-10, and HM-63 carbon fibers, all of which are PAN based continuous fibers available from Hexcel Corporation (Dublin, Calif.). IM-7 through IM-10 are continuous, high performance, intermediate modulus, PAN based carbon fibers available in 12,000 (12 K) filament count tows having minimal tensile strengths of 820 ksi, 880 ksi, 890 ksi, and 1,010 ksi, respectively.

Carbon fibers from other carbon manufacturers may also be used in some embodiments of the invention. For example, in some embodiments, suitable carbon fibers may include Aksaca 3 K A-38, 6 K A-38, 12 K A-42, 24 K A-42, 12 K A-49 and 24 K A-49 carbon fibers available from Dow Aksa Ileri Kompozit Malzemeler Saai Ltd, Sti, Istanbul, Turkey. These product designations indicate the approximate number of filaments/roving in thousands (3 K being 3,000 filaments, for example), and the approximate tensile strength of the fibers in hundreds of MPa (A-38 indicating a tensile strength of 3,800 MPa). Other carbon fibers that may be used in accordance with embodiments of the invention are believed to include T700 and T800, which are available from Toray Industries.

Preferably, carbon fibers used in embodiments of the invention are oxidized prior to the electrografting, and do not include additional activation groups, such as halogens (e.g., chlorine) that react with amino containing polymers. Rather, the amino containing groups of the polymers are covalently bonded directly to the surfaces of the carbon fibers. By "bonded directly" it is meant that following oxidation of the carbon fiber, there are no additional intermediate molecules that are reacted with moieties on the surface of the prior to electrografting. In other words, there is no additional reaction (e.g., activation) of the carbon fiber surface prior to electrografting of the amino containing polymer. As a result, the amino containing polymer is grafted directly to the surface of the carbon fiber.

Composite carbon fibers in accordance with embodiments of the invention may be used in a wide variety of reinforcement structures, For example, the composite fibers may arranged to form reinforcing structures that are unidirectional, bidirectional or multidirectional depending on the desired properties required in the final reinforced composite. The composite carbon fibers may be in the form of tows or fabrics and may be in the form of random, knitted, nonwoven, multi-axial (e.g., non-crimped fabric), braided or any other suitable pattern.

When unidirectional fiber layers are used, the orientation of the composite fibers may be the same or vary throughout a prepreg stack to form a so called non-crimp fabric (NCF). However, this is only one of many possible orientations for stacks of unidirectional fiber layers. For example, unidirectional fibers in neighboring layers may be arranged orthogonal to each other in a so-called 0/90 arrangement, which signifies the angles between neighboring fiber layers. Other arrangements, such as 0/+45/−45/90 are of course possible, among many other arrangements. In one embodiment, the carbon fibers may comprise a braided or non-crimp fabric having a basis weight from 150 to 2,000 g/m$^2$, and in particular from 300 to 1600 g/m$^2$.

Prepregs in accordance with embodiments of the present invention may be produced by infusing the carbon fibers or a fabric comprising the carbon fibers with a resin composition, such as an epoxy resin.

A wide variety of different resin compositions may be used in the practice of the invention. Preferably, the resin composition comprises a cross-linkable thermoset system. Suitable examples of the thermoset resins may include epoxy based resins, bismaleimide based resins, cyanate ester based resins, and phenolic based resins. Examples of suitable bismaleimide (BMI) resins that may be used in the invention is available from Hexcel Corporation under the tradename HEXPLY®.

In some embodiments, the resin composition may comprise a thermoplastic resin. Examples of suitable thermoplastic resins may include polyaryletherketones (PAEK), such as polyetheretherketones (PEEK) and Polyetherketoneketones (PEKK), polyamides, such as nylons, polyphenylene sulfides (PPS), polyetherimides (PEI), polyphenylene oxides (PPO), polyether sulfones (PES), polybenzimidazoles (PBI), and polycarbonates (PC).

In one embodiment the resin composition may comprise an epoxy resin composition. Typically, the resin composition may include from 55 to 75 weight percent of an epoxy resin component that includes one or more epoxy resins. The epoxy resins may be selected from any of the epoxy resins that are used in high performance aerospace epoxies. Difunctional, trifunctional and tetrafunctional epoxy resins may be used. In one embodiment, the epoxy resin may be made up substantially of a trifunctional epoxy compound. If desired, tetrafunctional epoxies may be included. The relative amounts of trifunctional and tetrafunctional epoxies may be varied as is known to one of skill in the art.

A trifunctional epoxy resin will be understood as having the three epoxy groups substituted either directly or indirectly in a para or meta orientation on the phenyl ring in the backbone of the compound. A tetrafunctional epoxy resin will be understood as having the four epoxy groups in the backbone of the compound. Suitable substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. Suitable non-epoxy substituent groups may be bonded to the phenyl ring at the para or ortho positions, or bonded at a meta position not occupied by an epoxy group.

Suitable trifunctional epoxy resins, by way of example, include those based upon: phenol and cresol epoxy novolacs; glycidyl ethers of phenol-aldelyde adducts; aromatic epoxy resins; dialiphatic triglycidyl ethers; aliphatic polyglycidyl ethers; epoxidised olefins; brominated resins, aromatic glycidyl amines and glycidyl ethers; heterocyclic glycidyl imidines and amides; glycidyl ethers; fluorinated epoxy resins or any combination thereof. A preferred trifunctional epoxy is the triglycidyl ether of para aminophenol, which is available commercially as Araldite MY 0500 or MY 0510 from Huntsman Advanced Materials (Monthey, Switzerland). A particularly preferred trifunctional epoxy is a triglycidyl ether of meta-aminophenol, which is available commercially from Huntsman Advanced Materials (Monthey, Switzerland) under the trade name Araldite MY0600, and from Sumitomo Chemical Co. (Osaka, Japan) under the trade name ELM-120.

Suitable tetrafunctional epoxy resins, by way of example, include those based upon: phenol and cresol epoxy novolacs; glycidyl ethers of phenol-aldelyde adducts; aromatic epoxy resins; dialiphatic triglycidyl ethers; aliphatic polyglycidyl ethers; epoxidised olefins; brominated resins, aromatic glycidyl amines and glycidyl ethers; heterocyclic glycidyl imidines and amides; glycidyl ethers; fluorinated epoxy resins or any combination thereof. A preferred tetrafunctional epoxy is N,N,N',N'-tetraglycidylmethylenedianiline, which is available commercially as Araldite MY0720 or MY0721 from Huntsman Advance Materials (Monthey, Switzerland).

If desired, the epoxy resin component may also include a difunctional epoxy. Examples of such difunctional epoxy include Bisphenol-A (Bis-A) or Bisphenol-F (Bis-F) epoxy resin.

Examples of suitable epoxy resins may include the diglycidyl ethers of polyhydric phenol compounds such as resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol, diglycidyl ethers of aliphatic glycols and polyether glycols such as the diglycidyl ethers of $C_{2-24}$ alkylene glycols and poly(ethylene oxide) or poly(propylene oxide) glycols; polyglycidyl ethers of phenol-formaldehyde novolac resins, alkyl substituted phenol-formaldehyde resins (epoxy novalac resins), phenol-hydroxybenzaldehyde resins, cresol-hydroxybenzaldehyde resins, dicyclopentadiene-phenol resins and dicyclopentadiene-substituted phenol resins, and any combination thereof.

Suitable diglycidyl ethers include diglycidyl ethers of bisphenol A resins such as are sold by The Dow Chemical Company under the designations D.E.R.® 330, D.E.R.® 331, D.E.R.® 332, D.E.R.® 383, D.E.R.® 661 and D.E.R.® 662 resins, and as Araldite GY6010 (Huntsman Advanced Materials). Exemplary Bis-F epoxy resin is available commercially as Araldite GY281 and GY285 (Huntsman Advanced Materials).

Commercially available diglycidyl ethers of polyglycols include those sold as D.E.R.® 732 and D.E.R.® 736 by Dow Chemical.

Epoxy novolac resins may also be used. Such resins are available commercially as D.E.N.® 354, D.E.N.® 431, D.E.N.® 438 and D.E.N.® 439 from The Dow Chemical Company The epoxy resin component may optionally include from 5 to 20 weight percent of a thermoplastic toughening agent. Thermoplastic toughening agents are well-known for use in preparing high performance epoxy resins. Exemplary toughening agents include polyether sulfone (PES), polyetherimide (PEI), polyamide (PA) and polyamideimide (PAI). PES is available commercially from a variety of chemical manufacturers. As an example, PES is available from Sumitomo Chemical Co. Ltd. (Osaka, Japan) under the tradename Sumikaexcel 5003p. Polyetherimide is available commercially as ULTEM 1000P from Sabic (Dubai). Polyamideimide is available commercially as TORLON 4000TF from Solvay Advanced Polymers (Alpharetta, Ga.). The thermoplastic component is preferably supplied as a powder that is mixed in with the epoxy resin component prior to addition of the curative agent. When present, the additional toughening agents are added to the resin system, and not further electrografted to the carbon fiber surface. In other words, the toughening agents may be present in addition to the amino containing polymer that has previously been electrografted to the carbon fiber surface as discussed above.

The epoxy resin composition may also include additional ingredients, such as performance enhancing and/or modifying agents. The performance enhancing or modifying agents, for example, may be selected from: flexibilizers, particulate fillers, nanoparticles, core/shell rubber particles, flame retardants, wetting agents, pigments/dyes, conducting particles, and viscosity modifiers.

In some embodiments, the infusion process may be carried out at an elevated temperature so that the viscosity of the resin composition is further reduced. However it must not be so hot for sufficient length of time that an undesirable level of curing of the resin composition occurs.

In a preferred embodiment of the invention, the infusion/impregnation of the resin composition into the carbon fibers is carried out at temperatures sufficient for the resin to flow into and between the fibers. For example, the infusion temperature of the resin composition may be in the range of from 100 to 200° C., with a range of 120 to 180° C., and in particular, a temperature of about 150° C. being more preferred. It should be recognized that temperature ranges outside the above ranges may also be used. However, the use of higher or lower infusion temperatures typically requires adjusting the machine speed at which the infusion process is carried out. For example, at temperatures greater than about 175° C., it may be necessary to carry out the infusion process at a higher machine speed in order to reduce the duration of time to which the resin composition is exposed to an elevated temperature to avoid undesirable crosslinking of the resin composition.

Similarly, to obtain a desired level of infusion and thereby decrease void spaces in the prepreg, the use of lower infusion temperatures will typically require a lower machine speed for infusing the epoxy resin composition into the fibrous material.

Typically the resin composition will be applied to the carbon fibers at a temperature in this range and consolidated into the fibers by pressure, such as that exerted by passage through one or more pairs of nip rollers.

A further aspect of the invention is directed to a process of preparing prepregs in accordance with embodiments of the invention. In a first step, the epoxy resin composition is extruded onto a sheet material to form a thin film coating thereon. The sheet material comprises a release film or paper from which the film coating of the epoxy resin composition may be transferred to the fibrous material during the prepregging process. After the film of the epoxy resin composition has been deposited on the sheet material, the sheet material with the film coating may be passed over a chill roll to cool the epoxy resin composition. The sheet material is then typically wound on a roll for future use.

Composite carbon fibers in accordance with the present invention may be used in a wide variety of applications where a fiber reinforced composite having high interlaminar strength as characterized by Short Beam Shear (SBS) strength and/or fracture toughness testing is desired. Although the composite carbon fibers may be used alone, the composite carbon fibers are generally combined with a resin to form a fiber reinforced composite material. The fiber reinforced composite materials may be in the form of a prepreg or cured final part. Although the fiber reinforced composite materials may be used for any intended purpose, they are preferably used in aerospace applications for both structural and non-structural parts.

For example, the composite carbon fibers may be used to form fiber reinforced composite materials that are used in structural parts of the aircraft, such as fuselages, wings and tail assemblies. The composite carbon fibers may also be used to make composite material parts that are used in non-structural areas of the airplane. Exemplary non-structural exterior parts include engine nacelles and aircraft skins. Exemplary interior parts include the aircraft galley and lavatory structures, as well as window frames, floor panels, overhead storage bins, wall partitions, wardrobes, ducts, ceiling panels and interior sidewalls.

EXAMPLES

Experimental Materials

The materials used in the adhesive compositions are identified below. All percentages are weight percents unless indicated otherwise. All physical property and compositional values are approximate unless indicated otherwise.

"PI" refers to an amine terminated polyimide polymer (having an average Mw of approximately 80,000 available from Huntsman under the product name MATRIMID® 5218.

"PIPA" refers to a polyamic acid polyimide polymer (25 weight % solution in N-methyl-2-pyrrolidone) precursor of PI obtained from Huntsman.

"PEI" refers to a polyetherimide available from Sabic under the product name ULTEM®1000.

"A-PPS" refers to an amine terminated polyethersulfone, available from Hexcel.

"PA" refers to a polyamide polymers available from EMS-Grivory under the product name GRILAMID TR-55®.

"ATBN" refers to an amine terminated acrylonitrile butadiene rubber available from CVC Thermoset Specialties under the product name HYPRO® 1300X42.

"CTBN" refers to a carboxylic acid terminated acrylonitrile butadiene rubber available from CVC Thermoset Specialties under the product name HYPRO® 1300X13.

"NMP" refers to N-methyl-2-pyrrolidone (>99.0%, A.C.S. reagent grade) available from SIGMA-ALDRICH®.

"DMF" refers to dimethylformamide (>99.0%, HPLC grade) available from SIGMA-ALDRICH®.

"DCM" refers to dichloromethane (>99.8%, A.C.S. reagent grade, anhydrous) available from SIGMA-ALDRICH®.

"TEABF" refers to tetraethylammonium tetrafluoroborate (99%), available from SIGMA-ALDRICH®.

"MEOH" refers to methanol (anhydrous), available from SIGMA-ALDRICH®.

"KOH" refers to potassium hydroxide (90.0%, reagent grade) available from SIGMA-ALDRICH®.

"IM-7" refers to a 100% nominal surface treated PAN based continuous carbon fiber (12,000 (12 K) filament count tows having a minimal tensile strength of 820 ksi) available from Hexcel Corporation under the tradename HEXTOW. The carbon fiber was unsized.

"AS-4" refers to a surface treated PAN based continuous carbon fiber (12,000 (12 K) filament count tows having a minimum tensile strength of 640 ksi), prepared by Hexcel Corporation. The carbon fiber was unsized.

"AS-4D" refers to a surface treated PAN based continuous carbon fiber (12,000 (12 K) filament count tows having a minimum tensile strength of 700 ksi that were prepared by Hexcel Corporation. The carbon fiber was unsized.

"G-size" refers to an epoxy based sizing available from Hexcel Corporation.

"BMI" refers to a proprietary bismaleimide resin obtained from Hexcel Corporation under the name HX 1624.

"EPOXY" refers to an epoxy resin obtained from Hexcel Corporation called HX 1635.

Test Methods

Test samples were prepared by cutting a 20 cm sample from a spool followed by sonication for 30 minutes in solvent. The solvent was changed to fresh after 15 minutes. The fiber samples were dried at 80° C. at reduced pressure overnight.

$G_{1C}$ Testing.

$G_{1C}$ Testing was in performed in accordance with the procedures set forth in standard BSS7273. Laminates for the $G_{1C}$ Testing were made as follows. 145 grade (145 g/m² fiber weight) prepregs were manufactured of experimental and control fibers with two separate resin systems, one epoxy based, and the other bis-maleimide based (BMI). These prepregs were manufactured on state of the art prepreg lines in house utilizing standard conditions for the base resins. The subsequent prepregs were then cut, plied, bagged and cured to produce multiple lamina and laminate panels. These panels were cut and tested per the following industry standards. 24 ply zero degree panels were manufactured with the center 4 plies comprising the previously prepared laminates. Sample width of each sample was 0.5±0.02 inches and length of each sample was 13 inches in the zero degree direction. Two inches of teflon was inserted in middle of the material of interest plies as a crack initiator. Five replicates were tested per variant. Results are reported in in-lb/in².

Short Beam Shear (SBS)

Various laminate panels were prepared to evaluate the interlaminar strength of fiber reinforced composites using SBS accordance with ASTM D 2344. Sample widths were 0.25±0.005 inches. 4:1 span to depth ratio was used. Nine replicates were tested per each sample.

Laminate panel samples were prepared using either BMI or epoxy resins. The BMI infused laminates had a basis weight of 190 g/m², and were prepared by laying down 12 plies of the carbon fibers. The epoxy infused laminates had a basis weight of 145 g/m², and were prepared by laying down 16 plies of the carbon fibers. The carbon fibers were laid down by hand or with a tension stand. All plies had 0° orientation and were laid onto BMI or epoxy tapes. The panels were then cut and pressed to form a prepreg. Carbon fiber lengths were approximately 30 meters. The laminates panels were cured according to the following:

Epoxy infused laminate panels were cured in an autoclave using two cycles:

1) cure cycle: the laminate panels were heated to 240° F., which was held for a duration of 65 minutes at a pressure of 85 PSI. The panels were then heated to 350° F., and held for a duration of 120 minutes at a pressure of 100 PSI. The panels were then cooled to 140° F. at a rate of 3° F. per minute.

2) post cure cycle: The panels were then heated to 350° F., which was held for a duration of 4 hours. The panels were then cooled down to 140° F.

BMI infuse laminates were similarly cured in an autoclave using two cycles:

1) cure cycle: the laminate panels were heated to 250° F., which was held for a duration of 30 minutes at a pressure of 85 PSI. The panels were then heated to 375° F., and held at this temperature for a duration of 250 minutes at pressure of 85 PSI. The panels were cooled to 140° F. at a rate of 3F per minute.

2) post cure cycle: The panels were then heated to 465° F., which was held for 6 hours and 30 minutes. The panels were then cooled down to 140° F.

Analysis of Amount of Polymer Deposited (Simple Extraction Method)

To determine the amount of polymer deposited on the carbon fiber following electrographing, a 10 g fiber sample was cut from the spool after the end of the run. The sample was dried overnight under reduced pressure at 80° C. The weight of dried fiber was recorded. This fiber was then sonicated for 30 minutes in NMP. The solvent was changed to fresh after 15 minutes. Both fractions of the solvent were discarded and the fiber was thoroughly washed with deionized water to remove any NMP. The washed fiber sample was then dried at 80° C. at reduced pressure overnight. The weight of the extracted fiber was obtained and the amount of polymer deposition was calculated from the sample weight difference from before and after the extraction.

In case of fiber sized with commercial G-size, dichloromethane was substituted for NMP solvent.

Analysis of Amount of Polymer Deposited (Digestion Method)

This method was used only for polymeric electrodeposition of polyimides, polyamide, and polyamic acid depositions. Following electrographing, a 10 g fiber sample was cut from the spool after the end of the run and dried overnight under reduced pressure at 80° C. The weight of dried fiber was recorded. This fiber sample was then heated at 80° C. in 5 wt. % potassium hydroxide aqueous solution for 6 hours under agitation. Following the 6 hours, the potassium hydroxide solution was discarded. The fiber sample was thoroughly washed with deionized water until neutral pH was achieved. The washed fiber sample was then dried at 80° C. at reduced pressure overnight. The weight of the digested fiber was measured and the amount of polymer deposited was calculated from the sample weight difference from before and after the digestion.

Analysis of Amount of Polymer Deposited (TGA Method)

All runs on fiber samples were performed in nitrogen from 30° C. to 1000° C. at 10° C./min rate. Firstly, two runs were performed on the feed fiber to establish a baseline for weight loss at any given temperature. Secondly two TGA runs under the same conditions were performed on the polymer materials to be coated onto fibers. Temperatures where the difference in weight loss of the fiber and of the polymer material was significant were chosen for analysis. For example, temperature of 600° C. was chosen for analysis of PI and A-PPS coated fibers, whereas 510° C. temperature was used for the analysis of ATBN and CTBN coated fibers. Same procedures were used for washed/extracted fibers to determine the amount of polymer electrografted onto the carbon surface.

Analysis of Amount of Electrografted Polymer

Two methods have been used to estimate the amount of polymer covalently attached to carbon fiber:

Method 1) In case of polyimide, polyetherimide, polyamide and polyamic acid the difference between the amount of polymer on fiber obtained by simple extraction method and digestion method (both described above) affords the estimate of the amount of polymer bound to the fiber (non-extractable).

Method 2) For all the cases TGA method described above was used on fibers that have been previously extracted by organic solvent of choice to remove all extractable polymer fractions.

3) SEM observation was used to confirm presence of coating after extraction in all cases.

Tow Property Evaluation

Figure 2:
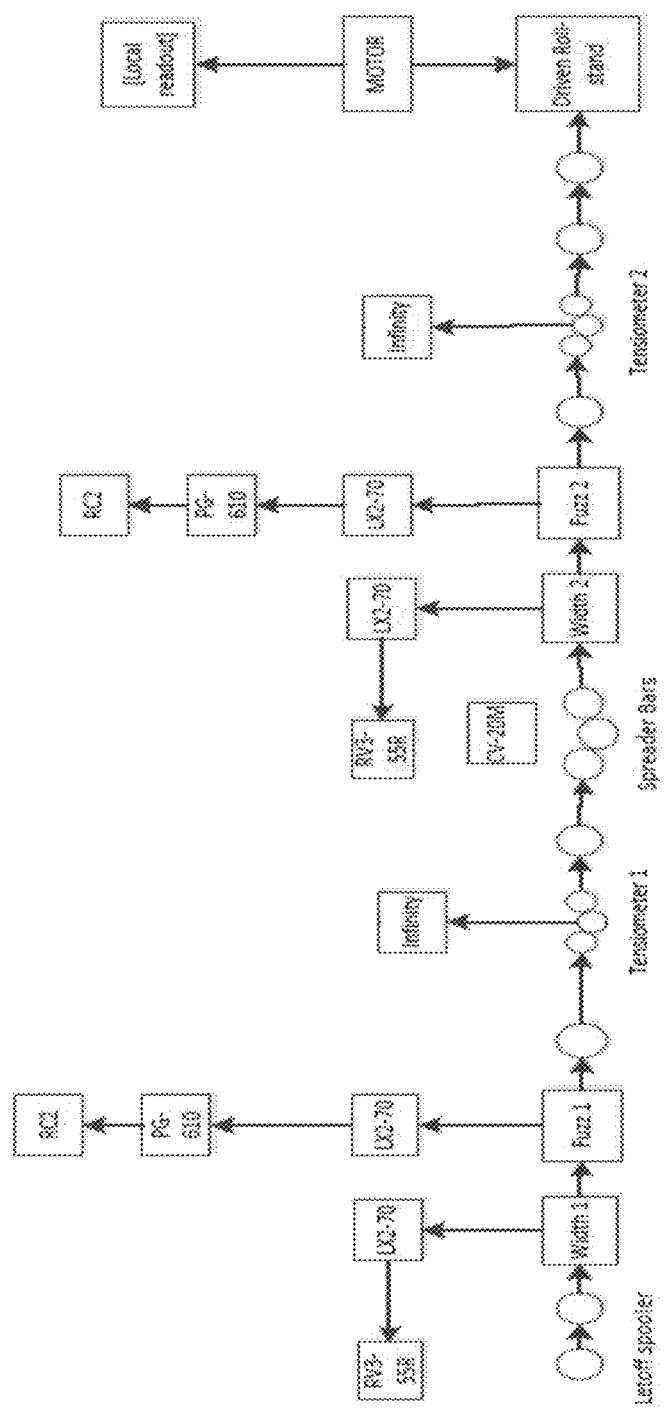
FIG. 2 shows a schematic representation of a Tow Evaluation Line used to evaluate tow properties (e.g., friction, fuzz (broken filament count) and tow spread)

Following electrografting, the composite carbon fibers were were evaluated for tow friction, fuzz (broken filament count) and tow spread. This evaluation was performed using the Tow Evaluation line, a representation of which is shown schematically in FIG. 2

Tension: With the system depicted in FIG. 2, tension was set to 100 g on Tensiometer 1 that fed back to let-off spooler. Tension was measured on Tensiometer 2. Friction was calculated using Capstan equation with tensions known and the total angle swept by all turns of the tow being 3.97 radians. Both tensiometers were manufactured by Tensitron Inc. S/N 73749. Both tensiometers fed into a readout "Infinity" manufactured by Newport Inc.

Spread/Width: Width 1 and Width 2 of the fiber tow were measured by "LX2-13" detectors manufactured by Keyence. These were connected through amplifiers "LX2-70" to controllers "RV3-55R", all manufactured by Keyence. Middle Width was measured over stainless steel spreader bars via digital camera system "CV-20M CCD Mega Digital" equipped with "CADBW13" flash, all manufactured by Keyence.

Fuzz: Broken filament count (Fuzz 1 and Fuzz 2) was analyzed by laser occlusion. A piece of tape corresponding to the width of the tow was placed along the path of the tow on detectors "LX2-12" and nitrogen was blown at the rate of 30 cfph upwards just before the detector perpendicular to the fiber path. Detectors "LX2-12" were connected to amplifiers "LX2-70" and "PG-610" which were connected to "RC-2" counters, all manufactured by Keyence.

All results are based on 250 feet of fiber processed on Tow Evaluation line ran at 800 ft/hr. Measurements were taken every 3 sec.

Electrografted fibers were compared to a blank run fiber—fiber ran through the same conditions, subjected to electrografting conditions without a polymer present in electrochemical bath and a fiber that was sized with Hexcel commercial sizing (G-size) on the same line (without applied voltage) at 9 ft/min line speed. G-size content of AS-4 fiber was found to be 0.32% by dichloromethane extractions (method described above).

Electrografting Procedure

Composite carbon fibers were prepared in accordance with the following procedures.

A bath similar to the one depicted in FIG. 1 was used to electro-graft the amine-functionalized polymers onto the surface of the carbon fibers. The power supply used in the electro-grafting process was a DC Power Supply 1030 from BK Precision. Carbon cathodes were used in the process. The cathodes had a generally elongated rectangular shape, and were supplied by Americarb (grade AX-50). Dimensions of the cathodes were: 21 cm×2.5 cm×1.2 cm. The experiment employed non-aqueous Ag/Ag+ reference electrodes or aqueous Ag/AgCl reference electrodes. The non-aqueous Ag/Ag+ reference electrodes (CHI 112) were purchased from CH instruments, Austin Tex., and were filled with 10 mM silver nitrate and 20 mM supporting electrolyte solutions in organic solvent.

Carbon fiber tow was fed from a controlled tension feed spooler over a steel roller. The steel roller was connected to the positive terminus of the power supply. The carbon cathodes were immersed in the bath and connected to the negative terminus of the power supply. The carbon fiber tow fed over a TEFLON® coated roller disposed in the bottom of the bath, and then was passed over a second steel roller outside of the bath. The carbon fiber was then washed with deionized water, dried, and then wound on a take-up spool.

The applied voltage was adjusted so that the potential read by the silver reference electrode placed in a close proximity of the carbon fiber tow was approximately 1.5 Volts. The distance between the cathodes was 2.5 cm and fiber travel path length was 61 cm (2 feet). The bath solution was recirculated by a peristaltic pump and replenished as needed to maintain a constant volume. The duration of the exposure of the carbon fiber to the bath was varied from 1 to 4 minutes depending on the experimental trial.

The volume of the bath was approximately 1 liter. The washing bath employed deionized water and included a multi-path and a multi-roller system with total volume of water of about 2 liters. The washing bath was purged and completely changed over every 30 minutes with fresh deionized water. The dryer was a drying tower which utilized hot air at 125° C. Line speeds were as follows: 3 ft/min (Examples 1-7), 2 ft/min (Examples 8 and 9) or 2.5 ft/min (Example 10).

Example 1

Electrografting of PI onto AS-4 Carbon Tow

In this example, an amine terminated polyimide polymer (PI) was electrografted onto an AS-4 carbon tow. The electrolyte bath comprised of a NMP solution 20 mM in tetraethylammonium tetrafluoroborate as supporting electrolyte (S.E.), and 3 wt. % PI. The PI was electrografted onto the AS-4 tow at 1.6V with a line speed 3 ft/min using the process described above. The resulting composite carbon fiber was then evaluated to determine the amount of polymer electrografted to carbon fiber tow. Simple Extraction, digestion, and TGA methods were used. The results are provided in 1, below.

TABLE 1

Analysis of polymer electrodeposited onto the carbon fiber

| Polymer | Polymer electrodeposited KOH digestion (wt. %) | Polymer electrodeposited Simple Extraction (wt. %) | Polymer electrografted Method 1 (wt. %) | Polymer electrografted TGA avg. (two measurements) (wt. %) |
|---|---|---|---|---|
| PI | 1.8 | 1.33 | 0.47 | 0.27 |

Figure 3A:
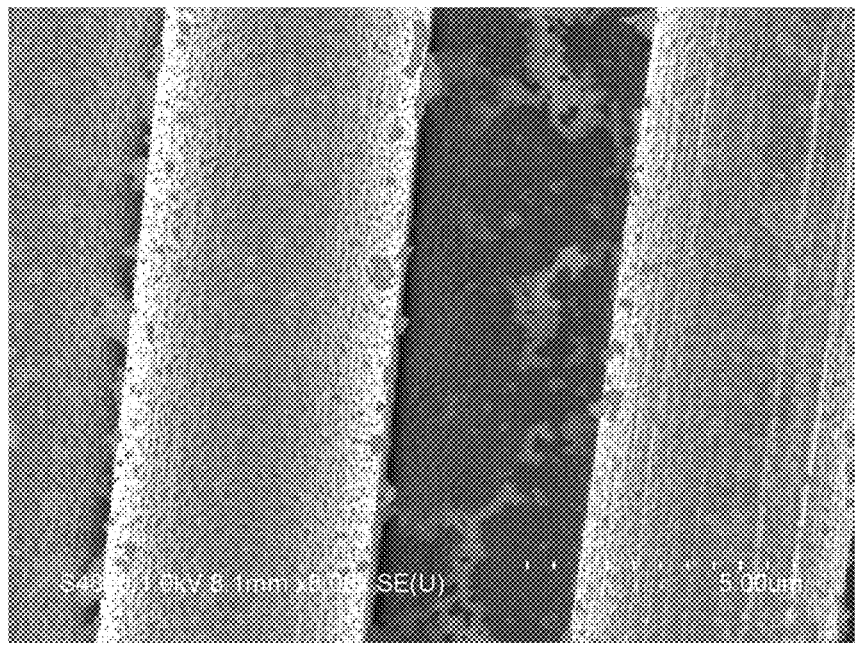
FIGS. 3A and 3B are SEM images of carbon fiber surfaces onto which an amine terminated polyimide polymer has been electrografted/electrodeposited.
Figure 3B:
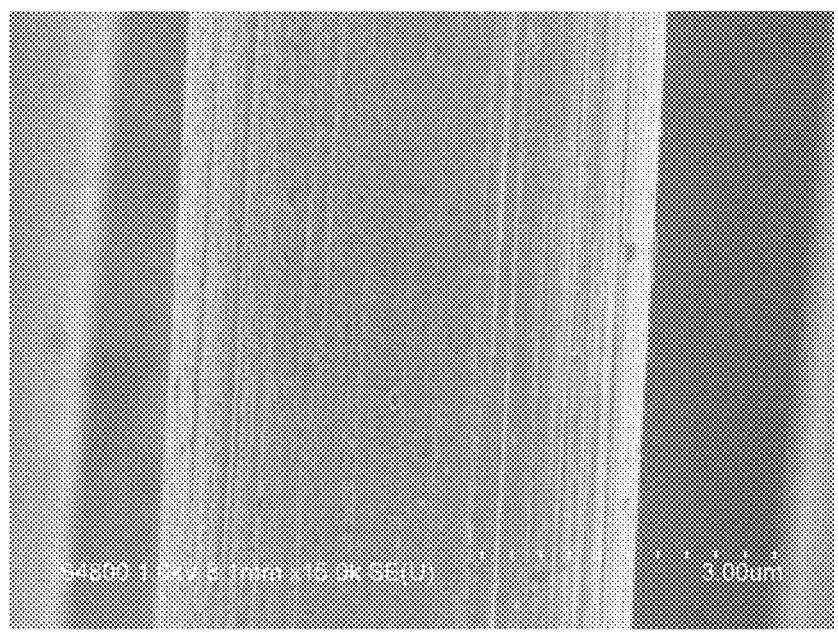

From Table 1, it can be seen that PI was successfully electrodeposited onto AS-4 carbon fiber surface and, more importantly, a significant fraction of that material was not extractable from the fiber surface (electrografted). This indicates that the PI was covalently attached to the fiber surface, and a stable interphase was formed. In this regard, FIGS. 3A and 3B are SEM images of the carbon fiber surface following electrografting (FIG. 3A), and following the Simple Extraction Method (FIG. 3B), discussed above. In FIG. 3B, it can be seen that electrografted polymer materials remain on the surface of the carbon fibers following extraction with NMP.

Figure 4:
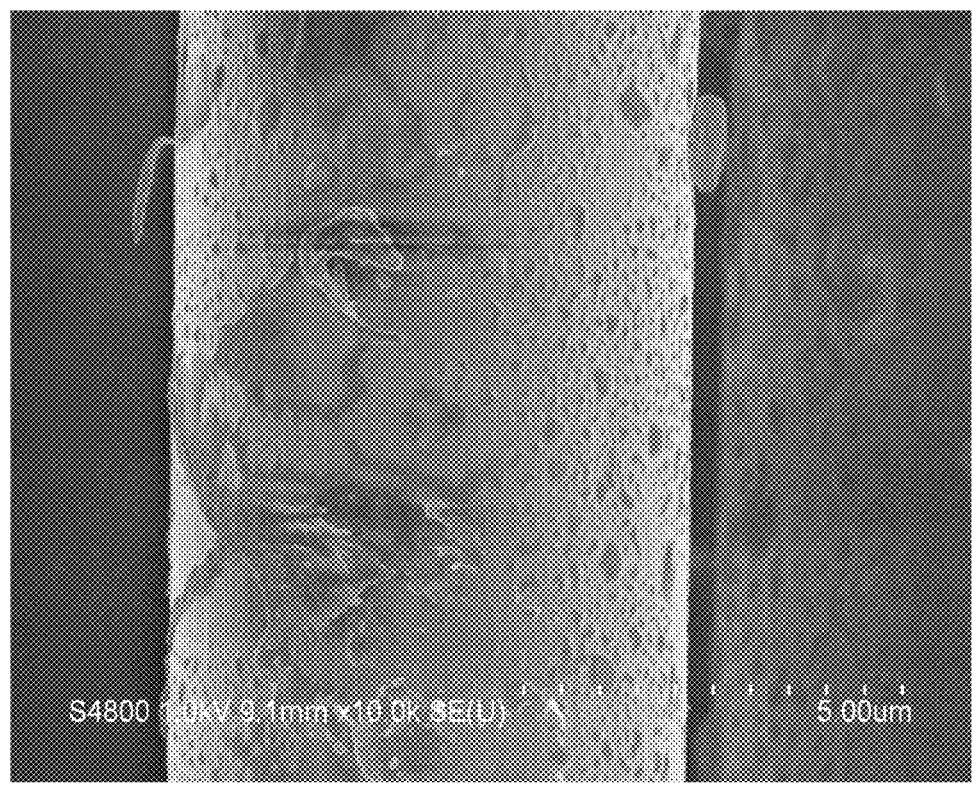
FIG. 4 is an SEM image of carbon fiber surfaces that shows several types of amine terminated polyimide polymer deposition.

FIG. 4 is another SEM image of the electrografted carbon fiber of Example 1, which shows several types of deposition, both electrografted and adsorbed polymer.

The electrografted carbon fiber of Example 1 was also evaluated to determine suitability of the polymer and process for use as a carbon size. The electrografted fiber was evaluated with the processes described above, and with the Tow Evaluation line schematically represented in FIG. 2. The electrografted carbon fiber of Example 1 was evaluated in comparison to a blank run carbon tow (no size) and a carbon tow sized with G-size. The results are provided in Table 2 below.

tow. PI electrografted carbon fibers also exhibited a better spread than fiber coated with epoxy-based G-size, which can be a significant advantage in such applications as weaving, for instance. Overall, it appears that PI can be advantageously used to size carbon fiber tows.

Example 2

Electrografting of A-PPS onto AS-4 12 K Fiber Tow.

In Example 2, an amine terminated polyethersulfone (A-PPS) was electrografted onto an AS-4 carbon tow. Two NMP solutions 20 mM in tetraethylammonium tetrafluoroborate supporting electrolyte (S.E.) containing 1 and 2 wt. % A-PPS were prepared. A-PPS was electrodeposited onto the AS-4 12,000 filament tow at 1.5V with line speed 3 ft/min using the set-up described above. The analysis of amounts of deposited polymer is provided in Table 3, below.

TABLE 3

Analysis of polymer electrodeposited onto the carbon fiber.

| Polymer | Polymer electrodeposited Simple Extraction (wt. %) | Polymer electrodeposited TGA avg. (two measurements) (wt. %) | Polymer electrografted TGA avg. (two measurements) (wt. %) |
|---|---|---|---|
| A-PPS (from 1% solution) | 0.61 | 0.38 | 0.15 |
| A-PPS (from 2% solution) | 1.2 | 1.15 | 0.15 |

Figure 5A:
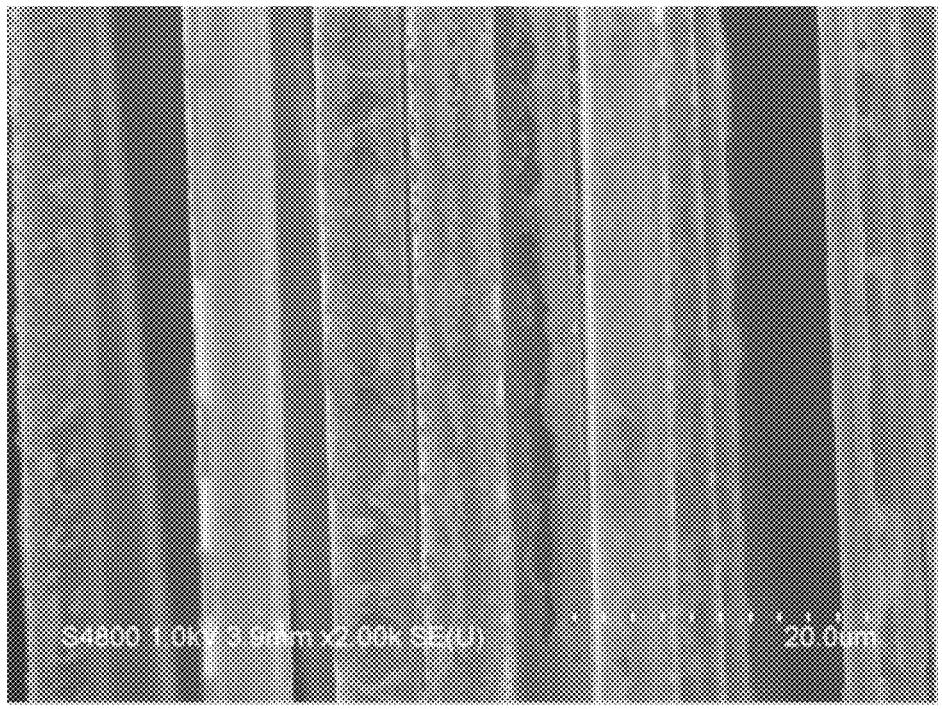
FIGS. 5A and 5B are SEM images of carbon fiber surfaces onto which an amine terminated polyethersulfone polymer has been electrografted/electrodeposited.
Figure 5B:
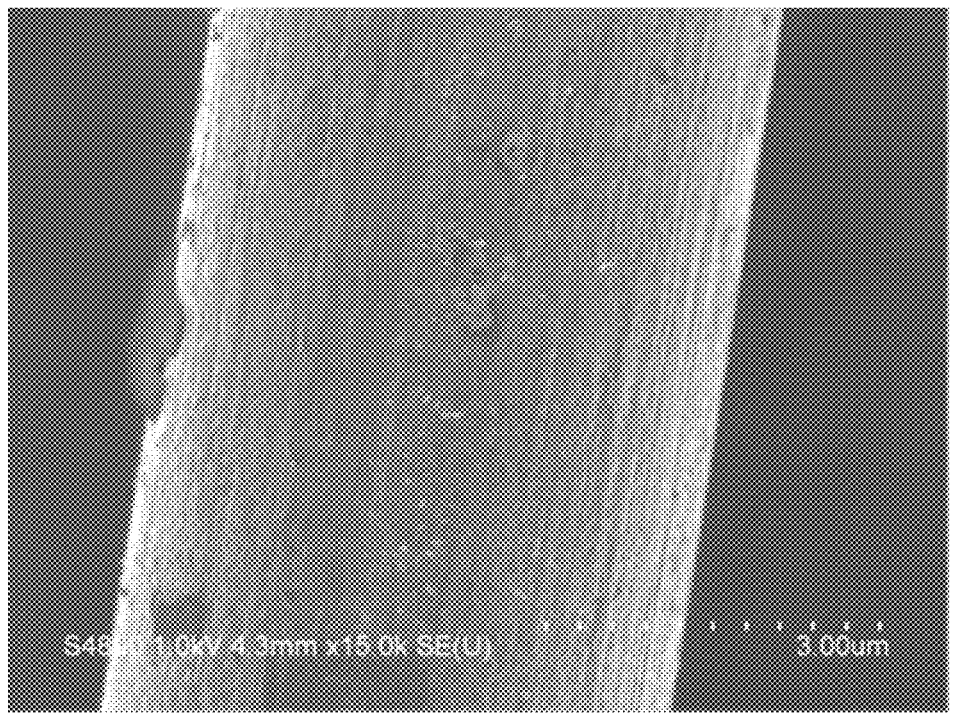

From the results in Table 3, it can be seen that in both cases A-PPS was successfully deposited onto the AS-4 carbon fiber surface and, more importantly, a fraction of that material was not extractable from the fiber surface, indicating covalent attachment of some of A-PPS polymer to the carbon fiber surface and a formation of stable interphase. This has been confirmed by SEM observation of coated (from 2% solution) and extracted fibers (FIGS. 5A and 5B), where the presence of electrografted polymer is discernable on the fibers extracted with NMP.

The electrografted carbon fibers of Example 2 were also evaluated to determine suitability of the polymer and process for use as a carbon size. The electrografted fiber was evaluated with the processes described above, and with the Tow Evaluation line schematically represented in FIG. 2. The electrografted carbon fibers of Example 2 were evaluated in comparison to a blank run carbon tow (no size) and a carbon tow sized with G-size. The results are provided in Table 4 below.

TABLE 2

Tow properties of electrodeposited fiber in comparison with a blank run fiber and fiber sized with commercial size.

| Sizing | Width 1 Ave | Width 1 Cv | Width Middle Ave | Width Middle Cv | Width 2 Ave | Width 2 Cv | Fuzz 1 | Fuzz 2 | μ Friction | WM/W1 Spread | W2/W1 Spread |
|---|---|---|---|---|---|---|---|---|---|---|---|
| Blank run | 5.772 | 15.191 | 12.314 | 39.801 | 13.043 | 17.243 | 2606 | 3052 | 0.192 | 2.1334 | 2.2597 |
| PI | 4.472 | 14.086 | 6.7587 | 10.123 | 5.8291 | 15.794 | 429 | 1089 | 0.470 | 1.5112 | 1.3034 |
| G-sized | 3.987 | 16.022 | 5.8788 | 41.355 | 4.4598 | 17.041 | 295 | 72 | 0.290 | 1.4746 | 1.1187 |

From Table 2, it can be seen that the PI electrografted carbon fiber tow showed a significant improvement in broken filament count when compared to the Blank run fiber tow. This improvement was somewhat lower than obtained from the G-sized tow. Friction of PI electrografted tow was also higher than that of the other blank run and the G-sized

TABLE 4

Tow properties of electrodeposited fiber in comparison with a blank run fiber and fiber sized with commercial size.

| Sizing | Width 1 Ave | Width 1 Cv | Width Middle Ave | Width Middle Cv | Width 2 Ave | Width 2 Cv | Fuzz 1 | Fuzz 2 | μ Friction | WM/W1 Spread | W2/W1 Spread |
|---|---|---|---|---|---|---|---|---|---|---|---|
| Blank run | 5.77211 | 15.1913 | 12.3142 | 39.8013 | 13.0434 | 17.2426 | 2606 | 3052 | 0.19228 | 2.133391 | 2.25972 |
| A-PPS (2%) | 2.72728 | 14.9435 | 8.0417 | 60.2789 | 2.9255 | 14.3076 | 78 | 158 | 0.55512 | 2.948609 | 1.07268 |
| A-PPS (1%) | 6.67665 | 10.7446 | 6.37926 | 35.7617 | 6.3453 | 10.8903 | 2397 | 2936 | 0.54043 | 0.955458 | 0.95037 |
| G-sized | 3.98666 | 16.0216 | 5.87884 | 41.3549 | 4.45976 | 17.0407 | 295 | 72 | 0.29048 | 1.474627 | 1.11867 |

From the results shown in Table 4, it can be seen that the A-PPS (1%) electrografted carbon fiber had unsatisfactory properties for use a size. In particular, the electrografted polymer showed virtually no improvement in fuzz reduction in comparison to the blank run. The A-PPS (1%) also exhibited low spread. However, fiber tow coated with 2% wt. solution (higher amount of deposition) shows a significant improvement in fuzz reduction, when compared to Blank run fiber. It is very similar in that respect to AS-4 tow sized with commercial G-size. A-PPS (2%) coated tow also exhibited good spread, similar to the results achieved in Example 1.

Example 3

Electrografting of ATBN (Amine-Terminated Acrylonitrile Butadiene Rubber) onto AS-4 12 K Fiber Tow.

In Example 3, an amine-terminated acrylonitrile butadiene rubber (ATBN) was electrografted onto an AS-4 carbon tow. A NMP solution 20 mM in tetraethylammonium tetrafluoroborate supporting electrolyte (S.E.) containing 1 wt. % ATBN was prepared as the electrolytic bath. ATBN was electrografted onto AS-4 12,000 filament tow at 1.5 V with a line speed of 3 ft/min using the set-up described above. The analysis of amounts of deposited polymer can be seen in Table 5, below.

TABLE 5

Analysis of polymer electrodeposited onto the carbon fiber

| Polymer | Polymer electrodeposited Simple Extraction (wt. %) | Polymer electrodeposited TGA avg (two measurements) (wt. %) | Polymer electrografted TGA avg (two measurements) (wt. %) |
|---|---|---|---|
| ATBN | 0.25 | 0.78 | 0.53 |

Figure 6A:
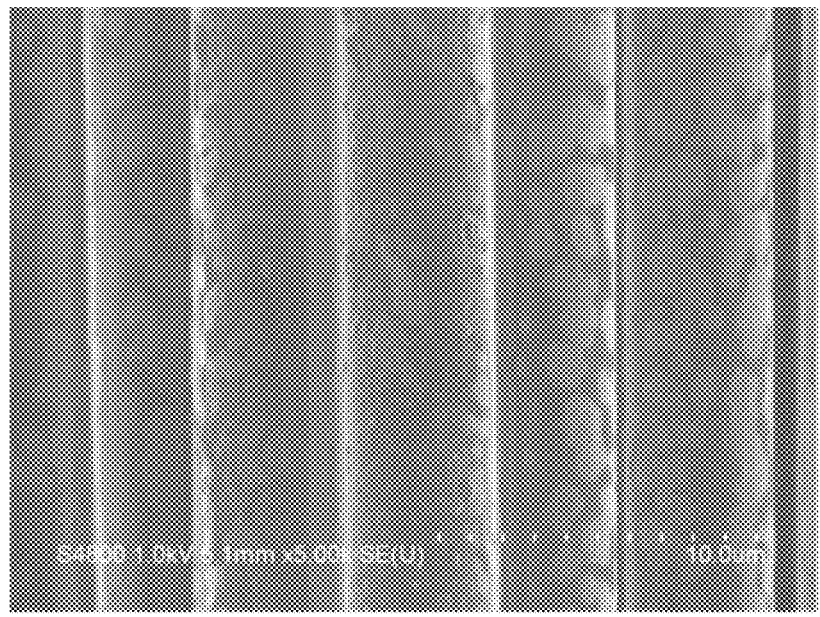
FIGS. 6A and 6B are SEM images of carbon fiber surfaces onto which amine terminated acrylonitrile butadiene rubber polymer has been electrografted/electrodeposited.
Figure 6B:
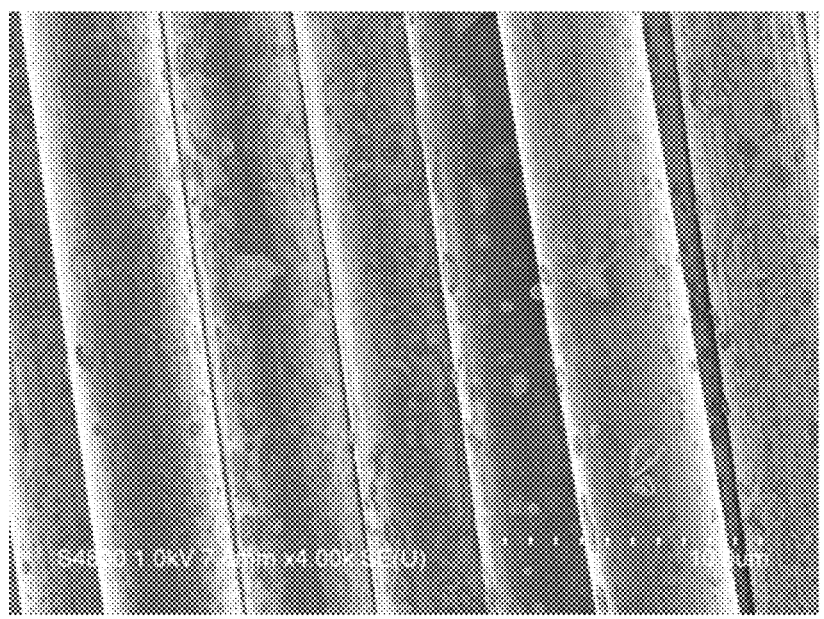

From the results in Table 5, it can be seen that ATBN was successfully deposited onto AS-4 carbon fiber surface and, more importantly, a significant fraction of that material was not extractable from the fiber surface, indicating covalent attachment of ATBN polymer to the carbon fiber surface and a formation of stable interphase. This has been confirmed by SEM observation of coated (even film deposition) and extracted fibers (FIGS. 6A and 6B), where one is able to discern a coating present on fibers after extraction with NMP. FIG. 6A shows an SEM image of the carbon fiber surface following electrografting prior to extraction. FIG. 6B shows an SEM image of the carbon fiber surface following extraction with NMP.

The electrografted carbon fibers of Example 3 were also evaluated to determine suitability of the polymer and process for use as a carbon size. The electrografted fiber was evaluated with the processes described above, and with the Tow Evaluation line schematically represented in FIG. 2. The electrografted carbon fibers of Example 3 were evaluated in comparison to a blank run carbon tow (no size) and a carbon tow sized with G-size. The results are provided in Table 6 below.

TABLE 6

Tow properties of electrodeposited fiber in comparison with a blank run fiber and fiber sized with commercial size.

| Sizing | Width 1 Ave | Width 1 Cv | Width Middle Ave | Width Middle Cv | Width 2 Ave | Width 2 Cv | Fuzz 1 | Fuzz 2 | μ Friction | WM/W1 Spread | W2/W1 Spread |
|---|---|---|---|---|---|---|---|---|---|---|---|
| Blank run | 5.77211 | 15.1913 | 12.3142 | 39.8013 | 13.0434 | 17.2426 | 2606 | 3052 | 0.19228 | 2.133391 | 2.25972 |
| ATBN | 2.78878 | 28.3129 | 5.9035 | 13.7729 | 3.94045 | 18.9146 | 734 | 226 | 0.40578 | 2.116877 | 1.41297 |
| G-sized | 3.98666 | 16.0216 | 5.87884 | 41.3549 | 4.45976 | 17.0407 | 295 | 72 | 0.29048 | 1.474627 | 1.11867 |

From the results in Table 6 it becomes apparent that AS-4 tow coated with ATBN shows a significant improvement in fuzz reduction, when compared to the Blank run fiber. This improvement is somewhat less than achieved for AS-4 tow sized with commercial G-size. ATBN coated tow also shows excellent spread much higher than that for G-sized fiber and like in case of Example 1, a somewhat higher friction, when compared to unsized or G-sized fibers.

Overall, it appears that ATBN can be advantageously used to size carbon fiber tows.

Example 4

Electrografting of CTBN (Carboxylic Acid-Terminated Acrylonitrile Butadiene Rubber) onto AS-4 12 K Fiber Tow.

In Example 4, a carboxylic acid-terminated acrylonitrile butadiene rubber (ATBN) was electrografted onto an AS-4 carbon tow. A NMP solution 20 mM in tetraethylammonium tetrafluoroborate supporting electrolyte (S.E.) containing 1 wt. % CTBN was prepared. Enough triethylamine to react half of the available carboxylic acid groups was added to the solution. To ensure a complete reaction solution was heated to 60° C. and stirred for 1 hr. Hypro® 1300X13 CTBN was electrodeposited onto AS-4 12,000 filament tow at 1.5V with line speed 3 ft/min using the set-up described above. The analysis of amounts of deposited material can be seen in Table 7.

TABLE 7

Analysis of polymer electrodeposited onto the carbon fiber

| Polymer | Polymer electrodeposited Simple Extraction (wt. %) | Polymer electrodeposited TGA avg. (two measurements) (wt. %) | Polymer electrografted TGA avg. (two measurements) (wt. %) |
|---|---|---|---|
| CTBN | 0.48 | 0.38 | 0 |

From Table 7, it can be seen that CTBN was successfully deposited onto AS-4 carbon fiber surface. The amount of deposition is less than in case of ATBN, even though identical conditions were used. Most importantly, unlike in the case of ATBN above, there appeared to be no significant grafted material present. All material present after electrodeposition was extractable by NMP. This has been confirmed by SEM observation of coated and extracted fibers (not shown) where no coating was observed on fibers after extraction with NMP.

Although, the CTBN was not electrografted to the carbon fibers, the use of CTBN as a carbon size was investigated. As in the previous examples, the carbon fiber of Example 4 was evaluated with the processes described above, and with the Tow Evaluation line schematically represented in FIG. 2. The carbon fibers of Example 4 were evaluated in comparison to a blank run carbon tow (no size) and a carbon tow sized with G-size. The results are provided in Table 8 below.

TABLE 8

Tow properties of CTBN deposited fiber in comparison with a blank run fiber and fiber sized with commercial size.

| Sizing | Width 1 Ave | Width 1 Cv | Width Middle Ave | Width Middle Cv | Width 2 Ave | Width 2 Cv | Fuzz 1 | Fuzz 2 | µ Friction | WM/W1 Spread | W2/W1 Spread |
|---|---|---|---|---|---|---|---|---|---|---|---|
| Blank run | 5.77211 | 15.1913 | 12.3142 | 39.8013 | 13.0434 | 17.2426 | 2606 | 3052 | 0.19228 | 2.133391 | 2.25972 |
| CTBN | 3.89251 | 18.7357 | 7.07083 | 11.8831 | 5.53643 | 12.8676 | 191 | 172 | 0.50146 | 1.816521 | 1.42233 |
| G-sized | 3.98666 | 16.0216 | 5.87884 | 41.3549 | 4.45976 | 17.0407 | 295 | 72 | 0.29048 | 1.474627 | 1.11867 |

From Table 8, it is evident that the AS-4 tow coated with CTBN shows a pronounced improvement in fuzz reduction, when compared to Blank run fiber. This improvement is somewhat similar than achieved for AS-4 tow sized with commercial G-size. CTBN coated tow also shows excellent spread much higher than that for G-sized fiber and, as in Example 1, a somewhat higher friction, when compared to unsized or G-sized fibers. Overall, it appears that CTBN can be advantageously used to size carbon fiber tows.

Comparative Example 5

Electrografting of Matrimid 5218 Polyamic Acid onto AS-4 12 K Fiber Tow.

In Comparative Example 5, a polymer of PIPA was deposited onto the surface of the carbon fiber tow. A NMP solution 20 mM in tetraethylammonium tetrafluoroborate supporting electrolyte (S.E.) containing 3 wt. % PIPA was prepared. To that solution enough triethylamine was added to react most all available acid groups. To ensure complete neutralization, the reaction solution was heated to 60° C. and stirred for 1 hour. Alternatively, a MeOH (10% NMP) solution 20 mM in tetraethylammonium tetrafluoroborate supporting electrolyte (S.E.) containing 3 wt. % PIPA was prepared. PIPA was then attempted to be electrodeposited from both solutions onto AS-4 12,000 filament tow at 1.5 V with a line speed of 3 ft/min using the set-up described above. The polymer deposited onto the fiber was imidized in a hot-air drying tower at 195° C. The analysis of amounts of deposited polymer can be seen in Table 9, below. In both cases TGA analysis results were hard to interpret, due to a rather low amount of polymer deposition and high temperature at which the analysis needed to be performed. As such, the TGA results are omitted from the Table 9.

TABLE 9

Coating analyses on electrodeposited fiber.

| Polymer | Polymer electro-deposited KOH digestion (wt. %) | Polymer electro-deposited Simple Extraction (wt. %) | Polymer electrografted, Method 1 (wt. %) |
|---|---|---|---|
| PIPA (NMP solution) | 0.5 | 0 | 0.5 |
| PIPA (MeOH/NMP solution) | 0.58 | 0.15 | 0.43 |

From Table 9, it can be seen that some of PIPA was deposited onto the AS-4 carbon fiber surface. There also appears to be some amount of the polymer material that is not extractable from the fiber, which would indicate that some electrografting has occurred. However, the amount of overall deposition was much lower than in Example 1, even though identical conditions were used.

Although, it appears that only minor amounts of PIPA may have been electrodeposited to the carbon fibers, the use of PIPA as a carbon size was investigated. As in the previous examples, the carbon fiber of Comparative Example 5 was evaluated with the processes described above, and with the Tow Evaluation line schematically represented in FIG. 2. The carbon fibers of Comparative Example 5 were evaluated in comparison to a blank run carbon tow (no size) and a carbon tow sized with G-size. The results are provided in Table 10 below.

TABLE 10

Tow properties of PIPA deposited fiber in comparison with a blank run fiber and fiber sized with commercial size

| Sizing | Width 1 Ave | Width 1 Cv | Width Middle Ave | Width Middle Cv | Width 2 Ave | Width 2 Cv | Fuzz 1 | Fuzz 2 | μ Friction | WM/W1 Spread | W2/W1 Spread |
|---|---|---|---|---|---|---|---|---|---|---|---|
| Blank run | 5.77211 | 15.1913 | 12.3142 | 39.8013 | 13.0434 | 17.2426 | 2606 | 3052 | 0.19228 | 2.133391 | 2.25972 |
| Polyamic acid | 5.64186 | 16.2193 | 11.8689 | 30.0102 | 11.8689 | 17.7671 | 3003 | 3009 | 0.23301 | 2.103724 | 2.10371 |
| G-sized | 3.98666 | 16.0216 | 5.87884 | 41.3549 | 4.45976 | 17.0407 | 295 | 72 | 0.29048 | 1.474627 | 1.11867 |

From the results in Table 10, it becomes apparent that AS-4 tow coated with PIPA does not show any improvement when compared to Blank run fiber. The fiber looks and behaves virtually unsized. This outcome is most likely due to insufficient deposition of the PIPA from NMP solution.

Overall, electrodeposition of polyamic acid based on PIPA does not lead to an efficient deposition) onto AS-4 fiber either from NMP or MeOH/NMP solution. In addition, the amount of deposition is much less than in case of PI (Example 1) fully imidized form. This less efficient deposition is likely the cause for unchanged tow properties of electrodeposited fiber when compared to the blank run unsized control.

Comparative Example 6

Electrografting of PEI onto AS-4 12 K Fiber Tow.

In Comparative Example 6, a non-amine terminated polyetherimide (PEI) was attempted to be electrografted onto the surface of the carbon fiber. A NMP solution 20 mM in tetraethylammonium tetrafluoroborate supporting electrolyte (S.E.) containing 2.5 wt. % PEI was prepared. The AS-4 12,000 filament tow was run through PEI containing bath at 1.5 V with line speed 3 ft/min using the set-up described above. The analysis of amounts of deposited polymer can be seen in Table 11, below.

TABLE 11

Coating analyses on PEI deposited fiber.

| Polymer | Polymer electro-deposited KOH digestion (wt. %) | Polymer electro-deposited Simple Extraction (wt. %) | Polymer electro-grafted Method 1 (wt. %) | Polymer electrografted TGA avg. (two measurements) (wt. %) |
|---|---|---|---|---|
| PEI | 1.56 | 1.78 | 0 | 0 |

From Table 11, it can be seen that some of the PEI was deposited onto AS-4 carbon fiber surface. However, all deposited material was extractable from the fiber surface, indicating no covalent attachment of the PEI to the carbon fiber surface. This has been confirmed by SEM observation of coated and extracted fibers (not shown) where no presence of any polymer on the surface of the carbon fibers extracted with NMP was discernable. This again, reinforces the need for amino containing terminal or pendant groups on the polymer backbone in order to achieve covalent bonding of the polymer to the carbon fiber surface.

Although, the PEI was not electrografted to the carbon fibers, the use of PEI as a carbon size was investigated. As in the previous examples, the carbon fiber of Comparative Example 6 was evaluated with the processes described above, and with the Tow Evaluation line schematically represented in FIG. 2. The carbon fibers of Comparative Example 6 were evaluated in comparison to a blank run carbon tow (no size) and a carbon tow sized with G-size. The results are provided in Table 12 below.

TABLE 12

Tow properties of PEI deposited fiber in comparison with a blank run fiber and fiber sized with commercial size

| Sizing | Width 1 Ave | Width 1 Cv | Width Middle Ave | Width Middle Cv | Width 2 Ave | Width 2 Cv | Fuzz 1 | Fuzz 2 | μ Friction | WM/W1 Spread | W2/W1 Spread |
|---|---|---|---|---|---|---|---|---|---|---|---|
| Blank run | 5.77211 | 15.1913 | 12.3142 | 39.8013 | 13.0434 | 17.2426 | 2606 | 3052 | 0.19228 | 2.133391 | 2.25972 |
| PEI | 5.97777 | 11.346 | 9.24713 | 34.1443 | 7.10318 | 17.7671 | 2621 | 3183 | 0.48845 | 1.546929 | 1.18827 |
| G-sized | 3.98666 | 16.0216 | 5.87884 | 41.3549 | 4.45976 | 17.0407 | 295 | 72 | 0.29048 | 1.474627 | 1.11867 |

The carbon fibers of Comparative Example 6 did not show any improvement in broken filament count when compared to the Blank run fiber (Table 12). Friction of PEI coated tow was also higher than that of the other two and the spread was lower. It is not completely clear at this point why PEI was ineffective as a size, when compared to Example 1. Both were present on fiber in similar amounts. It is possible that this phenomenon related to the inability of PEI to graft to the fiber surface and therefore, did not form a uniform coating.

Comparative Example 7

Electrografting of PA onto AS-4 12 K Fiber Tow.

In comparative Example 7, it was attempted to electrograft a polyamide (PA) polymer onto the surface of the carbon fiber. A NMP solution 20 mM in tetraethylammonium tetrafluoroborate supporting electrolyte (S.E.) containing 1 wt. % PA was prepared. The AS-4 12,000 filament tow was run through PA containing bath at 1.6 V with line speed 3 ft/min using the set-up described above. The analysis of amounts of deposited polymer can be seen in Table 13, below.

TABLE 13

Coating analyses of PA deposited fiber.

| Polymer | Polymer electro-deposited KOH digestion (wt. %) | Polymer electro-deposited Simple Extraction (wt. %) | Polymer electro-grafted Method 1 (wt. %) | Polymer electrografted TGA avg. (two measurements) (wt. %) |
|---|---|---|---|---|
| PA | 1.21 | 1.16 | 0 | 0 |

From Table 13, it can be seen that some PA was deposited onto the AS-4 carbon fiber surface. However, all deposited material was extractable from the fiber surface, indicating no covalent attachment of the polyamide polymer to the carbon fiber surface. This has been confirmed by SEM observation of coated and extracted fibers (not shown) where one is not able to discern a coating present on fibers extracted with NMP. Also in additional experiment, it has been shown that even when no voltage was applied to the cell, the amount of PA present on a fiber equaled to that reported in Table 13.

Example 8

Electrografting of PI onto IM-7 12 K Fiber Tow.

In Example 8, a PI polymer was grafted onto the surface of a IM-7 carbon fiber tow. A NMP solution 20 mM in tetraethylammonium tetrafluoroborate supporting electrolyte (S.E.) containing 3 wt. % PI was prepared. PI was electrodeposited onto IM-7 12,000 filament tow at 1.5 V with line speed 2 ft/min using the set-up described above. The analysis of amounts of deposited material can be seen in Table 14, below.

TABLE 14

Coating analysis on electrodeposited fiber.

| Polymer | Polymer electrodeposited TGA avg. (five measurements) (wt. %) |
|---|---|
| PI | 1.85 |

It can be seen from Table 14, that the PI polymer was successfully electrodeposited to the surface of the carbon fiber. The amount of polymer electrodeposited was nearly identical to the amount reported in Example 1.

In the following examples, the $G_{1C}$ Test properties of laminates prepared from the inventive composite carbon fibers were evaluated. Laminates were prepared with epoxy and BMI as the matrix resin. $G_{1C}$ Test properties were evaluated because this test provides probative insight to measure fracture toughness of the laminate. The fracture toughness describes the ability of a material containing a crack to resist fracture. The subscript 1 denotes mode 1 crack opening under a normal tensile stress perpendicular to the crack. More precisely, $G_{1C}$ test is a measure of critical strain energy release rate at which delamination occurs in mode 1 (tensile mode). Another quite common method is a measure of a Short Beam Shear strength. Short Beam Shear test is used to determine interlaminar shear strength in a specimen based on parallel fibers.

In Table 15 below, the $G_{1C}$ Test properties of the composite carbon fibers of Example 8 in epoxy and BMI resin were evaluated and compared to a blank run, which did not include a polymer electrografted to the surface of the carbon fiber. Procedures for preparing the $G_{1C}$ Test samples are discussed above.

TABLE 15

$G_{1C}$ properties of composites.

| Polymer | $G_{1C}$, BMI (in.-lb./in$^2$) | $G_{1C}$, epoxy (in.-lb./in$^2$) |
|---|---|---|
| Blank run | 2.36 | 2.03 |
| PI | 2.80 | 2.95 |

From Table 15, it can be seen that the electrografting of the PI polymer to the surface of the carbon fiber improved the fracture toughness of the fiber reinforced composite prepared from the inventive carbon fibers in comparison to a similar/identical fiber reinforced composite that did not include the PI polymer electrografted to the surface of the carbon fiber. In particular, the fiber reinforced composites in accordance with the invention, and prepared using the BMI resin exhibited an improvement in fracture toughness of 18.6%, and the fiber reinforced composites prepared using the Epoxy resin exhibited an improvement in fracture toughness of 45.3%.

Example 9

Electrografting of A-PPS onto IM-712 K Fiber Tow.

In Example 9, an amine terminated polyethersulfone (A-PPS) was electrografted onto the surface of a IM-7 12,000 filament tow. A NMP solution 20 mM in tetraethylammonium tetrafluoroborate supporting electrolyte (S.E.) containing 2 wt. % A-PPS was prepared a the electrolyte bath. A-PPS was electrodeposited onto IM-7 12,000 filament tow at 1.5 V with line speed 2 ft/min using the set-up described above. The analysis of amounts of deposited polymer can be seen in Table 16, below.

TABLE 16

Coating analysis on electrodeposited fiber.

| Polymer | Polymer electrodeposited TGA avg. (five measurements) (wt. %) |
|---|---|
| A-PPS | 1.5 |

The amount of polymer electrodeposited onto the fiber surface was slightly higher to that of Example 2. This higher polymer deposition may be due to increased time of deposition (e,g, lower line speed).

In Table 17 below, the $G_{1C}$ Test properties of the composite carbon fibers of Example 9 in epoxy and BMI resin were also evaluated and compared to a blank run, which did not include a polymer electrografted to the surface of the carbon fiber.

TABLE 17

$G_{1C}$ properties of composites.

| Polymer | $G_{1C}$, BMI (in.-lb./in$^2$) | $G_{1C}$, epoxy (in.-lb./in$^2$) |
|---|---|---|
| Blank run | 2.36 | 2.03 |
| A-PPS | 3.57 | 2.31 |

From Table 17, it can be seen that the electrografting of the A-PPS polymer to the surface of the carbon fiber improved the fracture toughness of the fiber reinforced composite prepared from the inventive carbon fibers in comparison to a similar/identical fiber reinforced composite that did not include the A-PPS polymer electrografted to the surface of the carbon fiber. In particular, the fiber reinforced composites in accordance with the invention, and prepared using the BMI resin exhibited an improvement in fracture toughness of 51.3%, and the fiber reinforced composites prepared using the Epoxy resin exhibited an improvement in fracture toughness of 13.3%.

Example 10

Electrografting of ATBN (Amine-Terminated Acrylonitrile Butadiene Rubber) onto IM-712 K Fiber Tow.

In Example 10, an amine-terminated acrylonitrile butadiene rubber was electrografted onto a IM-712 K fiber tow. A NMP solution 20 mM in tetraethylammonium tetrafluoroborate supporting electrolyte (S.E.) containing 2 wt. % ATBN was prepared as an electrolytic bath. The ATBN was electrodeposited onto IM-7 12,000 filament tow at 1.5 V with line speed 2.5 ft/min using the set-up described above. The analysis of amounts of deposited material can be seen in Table 18, below.

TABLE 18

Coating analysis on electrodeposited fiber.

| Polymer | Polymer electrodeposited TGA avg. (five measurements) (wt. %) |
|---|---|
| ATBN | 0.95 |

Again, the amount of polymer electrodeposited onto the surface of the carbon fiber was slightly higher to the one reported in Example 3, which is probably due to increased time of deposition (lower line speed) and higher polymer concentration in the treatment bath.

In Table 19 below, the $G_{1C}$ Test properties of the composite carbon fibers of Example 9 in epoxy and BMI resin were also evaluated and compared to a blank run, which did not include a polymer electrografted to the surface of the carbon fiber.

TABLE 19

$G_{1C}$ properties of composites.

| Polymer | $G_{1C}$, BMI (in.-lb./in$^2$) | $G_{1C}$, epoxy (in.-lb./in$^2$) |
|---|---|---|
| Blank run | 2.36 | 2.03 |
| ATBN | 3.17 | 2.30 |

From Table 19, it can be seen that the electrografting of the ATBN polymer to the surface of the carbon fiber improved the fracture toughness of the fiber reinforced composite prepared from the inventive carbon fibers in comparison to a similar/identical fiber reinforced composite that did not include the ATBN polymer electrografted to the surface of the carbon fiber. In particular, the fiber reinforced composites in accordance with the invention, and prepared using the BMI resin exhibited an improvement in fracture toughness of 34.3%, and the fiber reinforced composites prepared using the Epoxy resin exhibited an improvement in fracture toughness of 13.3%.

Example 11

Electrografting of PI onto AS4D 12 K Fiber Tow.

In Example 11, an amine terminated polyimide polymer (PI) was electrodeposited onto the surface of an AS4D 12 K fiber tow. A NMP solution 20 mM in tetraethylammonium tetrafluoroborate supporting electrolyte (S.E.) containing 3 wt. % PI was prepared as the electrolytic bath. PI was electrodeposited onto the AS4D 12,000 filament tow at 1.6 V and 1.5 V with line speeds of 4 ft/min using the set-up described above. The analysis of amounts of deposited material can be seen in Table 20, below.

TABLE 20

Coating analysis on electrodeposited fiber.

| Polymer | Coating %, KOH digestion | Coating %, NMP extraction |
|---|---|---|
| PI deposited at 1.6 V | 1.39 | 0.99 |
| PI deposited at 1.5 V | 1.34 | 0.96 |

From Table 20, it can be seen that the amount of PI electrografted onto the surface of the carbon fiber was lower than that provided in Example 1, which is believed to be due lower exposure times because of the higher line speeds at which the carbon fiber passed through the bath.

Short Beam Shear (SBS) properties of laminates based on the composite carbon fiber of Example 11 were also evaluated, and compared to the feed (control) fiber. The laminates were prepared using BMI as the resin in accordance with the procedures discussed above. The results are provided in Table 21, below.

TABLE 21

SBS properties of composites.

| Polymer | SBS ksi |
|---|---|
| Feed fiber (Control) | 16.91 ± 0.43 |
| Example 11 deposited at 1.6 V | 17.91 ± 0.39 |
| Example 11 deposited at 1.5 V | 18.46 ± 0.39 |

Summary of Examples

In Examples 1-7, electrografting of various polymers onto AS-4 carbon fiber tow was investigated. The amount of polymer deposited and the mode of attachment/deposition was also investigated for all cases. All fibers used were based on AS-4 12 K unsized tow (Hexcel). Furthermore, tows bearing electrodeposited materials were compared to controls (Blank run fiber and fiber sized with commercial G sizing (Hexcel)) to estimate effectiveness of deposited polymeric materials as sizing agents. Three tow parameters: fuzz (broken filament count), spread and friction were used for the evaluation. It has been shown that depositing coatings from Examples 1-4 could improve tow properties and make fiber easier to handle when compared to unsized control. There is, therefore, a possible application to use such coatings advantageously as sizing for carbon fibers.

In Examples 1-3, based on analysis of the polymer deposition, it was shown that there was always some amount of polymer that could not be extracted from the carbon surface. Generally, two mechanisms of deposition were observed for these samples, where some amount of polymer <1 wt. % was grafted/immobilized onto carbon fiber surface and the rest was simply precipitated over the carbon fiber surface (extractable). While not wishing to be bound by theory, it is believed that grafting proceeded via oxidation of chain-end amine groups of the polymers to free radical species that reacted with active sites on carbon fiber forming a stable immobile polymer layer on the surface of the fiber.

In Examples 4 and 5, attempts were made to employ a different type of chemistry to create free radical species that could facilitate grafting. Both polymers tested had carboxylic groups present. Kolbe chemistry is known to proceed via decarboxylation of some organic carboxylic acids to yield free radical products. Indeed, some of them are known to graft onto carbon materials. Speculations have been made in literature that polyamic acids can in principle undergo Kolbe reaction and graft onto carbon fiber materials.

In Example 4 (CTBN rubber), no grafting was observed, and very inefficient grafting in Example 5 (Matrimid 5218 polyamic acid). Electrodeposition of polyamic acids onto carbon fiber is well known, however, it appears to be plagued by side reactions. While not wishing to be bound by theory, it is believed that substrates, as polyamic acids, do not undergo Kolbe reaction cleanly, but are always accompanied by a Hofer-Moest reaction which proceeds to yield different products that are often products of cationic species reacting with the solvent. In Example 5, little of the polymer was electrografted onto the surface of the carbon fiber. It is theorized that this is most likely because Hofer-Moest reaction products of polyamic acid were soluble in NMP.

In conclusion, it was observed that in Example 4 the only one mode of deposition was via adsorption, and no apparent grafting of the polymer occurred. It is believed that the lack of grafting was due to the unavailability of terminal or pendant amino containing groups on the polymer backbone. It was impossible therefore, employing such a polymer, to construct a stable interphase that could serve as a toughening agent between fiber and matrix with electrografting.

In Example 5, electrodeposition proceeded very inefficiently producing only a lightly coated tow, which was not different enough from the unsized control. Moreover, it needs to be understood, that by subjecting polyamic acids to decarboxylation reactions, one generates materials that cannot be fully imidized upon heat treatment subsequently, simply because of the absence of the carboxylic groups in the polymer structure. This creates materials with defect sites that have diminished stability at elevated temperature when compared to fully imidized analogues.

Examples 6 and 7 demonstrated the requirement of the available amine-functionality presence in the polymer backbone for successful grafting. The explanation for this functionality's absence for the polyamide used in Example 7 is explained in U.S. Pat. No. 4,755,585. The exact explanation for its unavailability in polyimide in Example 6 was unknown, but is confirmable by Cyclic Voltammetry method. In both cases, the amount of coating adsorbed on a fiber after attempted electro-deposition/grafting appeared to be very similar to simple sizing from the solution at the same conditions, but with no voltage applied. In Example 6 the resulting coating was found to be ineffective as sizing.

The effect of grafted polymers on $G_{1C}$ properties of IM-7 12 K based laminates in both epoxy and BMI resins, as well as the effect of former on Short Beam Shear (SBS) properties of BMI laminates based on AS4D 12 K fiber were also investigated. Polymers from examples 1-3 were tested vs. a blank run fiber, which went through the same electrodeposition conditions, but with polymer absent. As can be seen in Examples 8-10 the presence of electrografted polymer coatings did improve fiber-matrix interphase properties as revealed by increased fracture toughness.

Example 11 demonstrates a significant improvement in Short Beam Shear properties of the BMI laminates based on PI electrografted onto AS-4D fibers when compared to the feed fiber control, undoubtedly due to the presence of toughened interphase.

SUMMARY OF EMBODIMENTS

1. A composite carbon fiber comprising a carbon fiber having an amino containing polymer electro-grafted onto a surface thereof via an amino containing end group, amino containing pendant group, amino containing main group, or combination thereof of the polymer.

2. The composite carbon fiber of embodiment 1, wherein the polymer is selected from the group consisting of polyamides, polyetheramides, polyimides, polyamide-imides, polyetherimides, polyethersulfones, polyetherethersulfones, and diene-based rubbers.

3. The composite carbon fiber of any one of the preceding embodiments, wherein the polymer is selected from the group consisting of amine-terminated polyimides, amine-terminated polyetherimides, amine-terminated polyether sulfones, amine-terminated diene-based rubbers, and amine-terminated polyamides.

4. The composite carbon fiber of any one of the preceding embodiments, wherein the amino containing end group or amino containing pendant group comprises a primary or secondary amine.

5. The composite carbon fiber of any one of the preceding embodiments, wherein the polymer comprises a nylon, para-aramids, meta-aramids, or a combination thereof.

6. The composite carbon fiber of any one or more of embodiments 1-4, wherein the polymer comprises a polyether block amide (PEBA) that is functionalized to include a terminal or pendant amino containing group.

7. The composite carbon fiber of any one or more of embodiments 1-4, wherein the polymer comprises a polyimide.

8. The composite carbon fiber of any one or more of embodiments 1-4, wherein the polymer has the formula:

Formula (III)

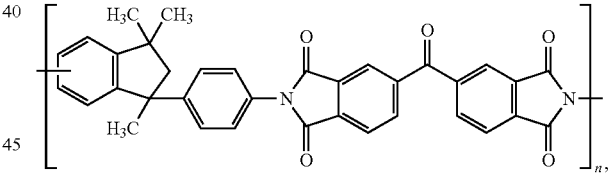

and n is a number from about 2 to 500.

9. The composite carbon fiber of any one or more of embodiments 1-4, wherein the polymer has the formula:

Formula (IV)

and n is a number from about 2 to 500.

10. The composite carbon fiber of anyone or more of embodiments 1-4, wherein the polymer comprises a polyetherimides having the general formula:

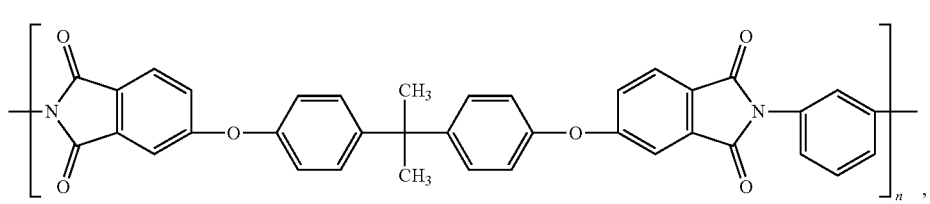
Formula (V)

and n is a number from about 2 to 500.

11. The composite carbon fiber of any one or more of embodiments 1-4, wherein the polymer comprises a polyamide-imides having the general formula:

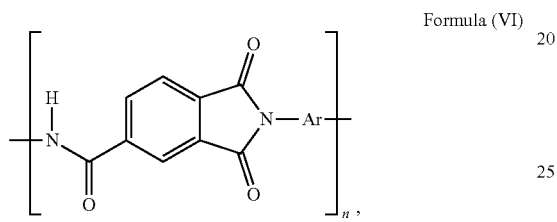
Formula (VI)

and n is a number from about 2 to 500.

12. The composite carbon fiber of any one or more of embodiments 1-4, wherein the polymer comprises an amino terminated sulfone polymers having the general formula aryl-$SO_2$-aryl.

13. The composite carbon fiber of embodiment 12, wherein the polymer has the formula

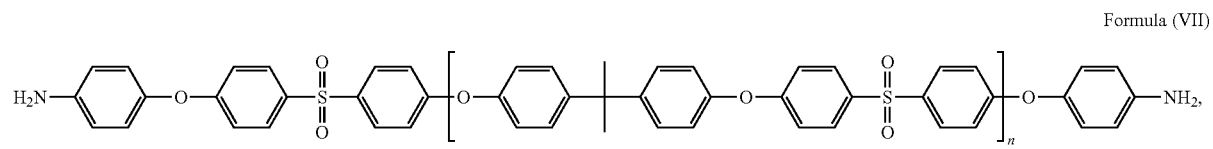
Formula (VII)

where n is a number from about 2 to 500.

14. The composite carbon fiber of any one or more of embodiments 1-4, wherein the polymer comprises a diene rubber polymer comprising two or more monomers selected from the group consisting of butadiene, isoprene, acrylates, methacrylates, acrylonitriles, and ethylene-propylene dienes.

15. The composite carbon fiber of any one or more of embodiments 1-4, wherein the polymer has the formula:

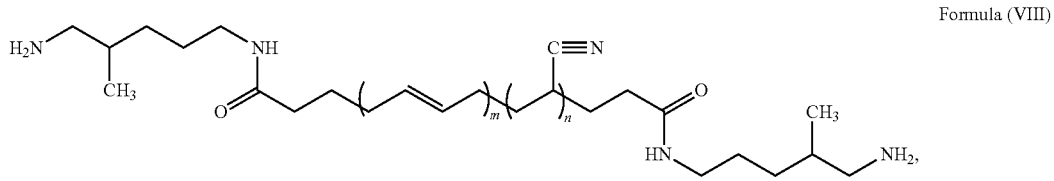
Formula (VIII)

and m is a number from about 20 to 100, and n is a number from about 10 to 50.

15. The composite carbon fiber of any one or more of embodiments 1-4, wherein the polymer is selected from the following:

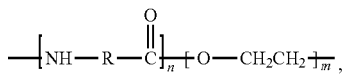

Formula (I)

where m and n are independently a number from about 2 to 500, and in particular, from about 10 to 250 and more particularly, from about 10 to 150;

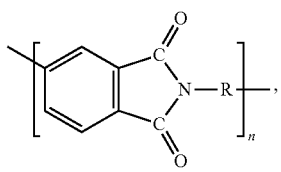

Formula (II)

where the polymer backbone is terminated with one or more amino containing groups, contains one or more amino containing pendant groups, or a mixture thereof, R is an alkyl group ($C_1$-$C_{10}$), ether, ester, or aryl group; and n is a number from about 2 to 500, and in particular, from about 10 to 150, and more particularly, from about 10 to 30;

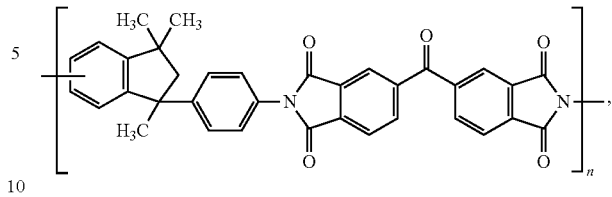

Formula (III)

where the polymer backbone is terminated with one or more amino containing groups, contains one or more amino containing pendant groups, or a mixture thereof, and n is a number from about 2 to 500, and in particular, from about 10 to 250, and more particularly, from about 20 to 150;

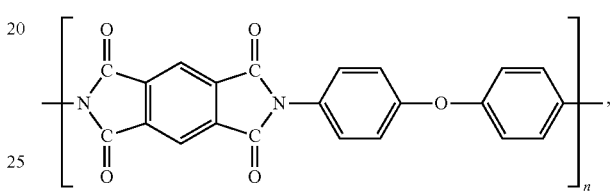

Formula (IV)

where the polymer backbone is terminated with one or more amino containing groups, contains one or more amino containing pendant groups, or a mixture thereof, and n is a number from about 2 to 500, and in particular, from about 10 to 10, and more particularly, from about 10 to 50;

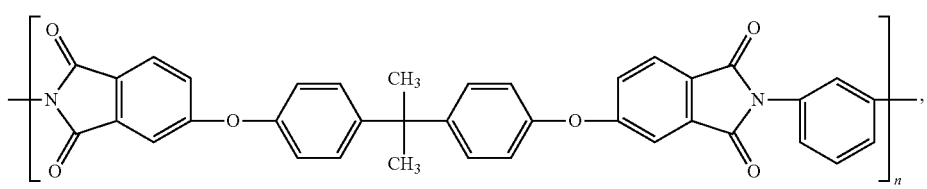

Formula (V)

where the polymer backbone is terminated with one or more amino containing groups, contains one or more amino containing pendant groups, or a mixture thereof, and n is a number from about 2 to 500, and in particular, from about 10 to 100, and more particularly, from about 10 to 50;

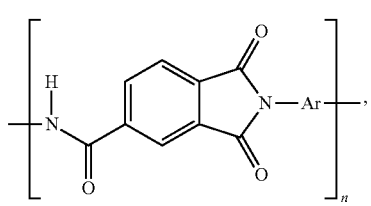

Formula (VI)

where the polymer backbone is terminated with one or more amino containing groups, contains one or more amino containing pendant groups, or a mixture thereof, and n is a number from about 2 to 500, and in particular, from about 10 to 100, and more particularly, from about 10 to 50;

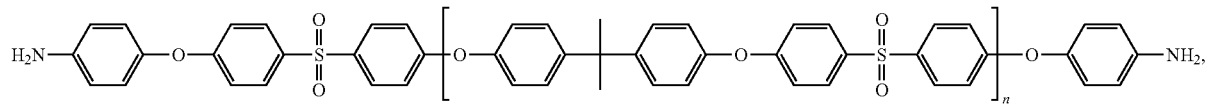
Formula (VII)

Where the polymer backbone is terminated with one or more amino containing groups, contains one or more amino containing pendant groups, or a mixture thereof, and n is a number from about 2 to 500, and in particular, from about 10 to 100, and more particularly, from about 10 to 50; and

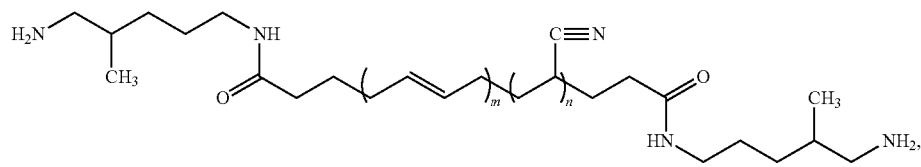
Formula (VIII)

where m is a number from about 20 to 100, and n is a number from about 10 to 50.

16. The composite carbon fiber of any one or more of the preceding embodiments, wherein the amount of polymer covalently attached to the surface of the carbon fiber is from about 0.05 to 3 weight percent, based on the total weight of the composite carbon fiber.

17. The composite carbon fiber of any one or more of the preceding embodiments, wherein the amount of polymer covalently attached to the surface of the carbon fiber is from about 0.1 to 0.5 weight percent, based on the total weight of the composite carbon fiber.

18. The composite carbon fiber of any one or more of the preceding embodiments, wherein the carbon fiber has a tensile strength of at least 400 ksi.

19. The composite carbon fiber of any one or more of the preceding embodiments, wherein the carbon fiber has a tensile strength from about 600 to 1,050 ksi.

20. The composite carbon fiber of any one or more of the preceding embodiments, wherein the polymer has a weight average molecular weight ranging from about 5,000 to 35,000.

21. The composite carbon fiber of any one or more of the preceding embodiments, wherein the polymer only has an amino group at the end of a backbone of the polymer.

22. The composite carbon fiber of any one or more of the preceding embodiments, wherein the polymer does not include any amino containing pendant groups.

23. The composite carbon fiber of any one or more of the preceding embodiments, wherein the polymer comprises from about 1 to 20 amino containing pendant groups.

24. The composite carbon fiber of any one or more of the preceding embodiments, wherein the polymer is electro-grafted to the surface of the carbon fiber via 1 to 100 amino linkages.

25. The composite carbon fiber of any one or more of the preceding embodiments, wherein the polymer is electro-grafted to the surface of the carbon fiber via 1 to 20 amino linkages, and in particular, via 1 to 2 amino linkages.

26. A fiber reinforced composite comprising the composite carbon fiber of any one or more of the preceding embodiments.

27. A fiber reinforced composite comprising a carbon fiber having an amino containing polymer electro-grafted onto a surface thereof via an amino containing end group or amino containing pendant group of the polymer, and a resin matrix infused into the carbon fiber, wherein the fiber reinforced composite exhibits an increase in fracture toughness from about 10 to 60% in comparison to an identical fiber reinforced composite with the exception that the surfaces of the carbon fibers do not include an amine-containing polymer electrografted to the surface of the carbon fiber.

28. The fiber reinforced composite according to embodiment 27, wherein the fiber reinforced composite exhibits an increase in fracture toughness ranging from about 10 to 55%.

29. The fiber reinforced composite according to embodiment 27, wherein the fiber reinforced composite exhibits an increase in fracture toughness ranging from about 30 to 55%.

30. The fiber reinforced composite according to embodiment 27, wherein the fiber reinforced composite exhibits an increase in fracture toughness ranging from about 13 to 51%.

31. A fiber reinforced composite comprising a carbon fiber having an amino containing polymer electro-grafted onto a surface thereof via an amino containing end group or amino containing pendant group of the polymer, and a resin matrix infused into the carbon fiber, wherein the fiber reinforced composite exhibits an interlaminar strength of about 17 to 25 ksi as characterized by Short Beam Shear (SBS) testing.

32. The fiber reinforced composite of embodiment 31, wherein the interlaminar strength of the fiber reinforced composite is about 20 to 22 ksi as characterized by SBS.

33. The fiber reinforced composite of embodiments 31 or 32, wherein the fiber reinforced composite exhibits an increase in SBS ranging from about 5 to 25% in comparison to a similar fiber reinforced composite in which the carbon fibers are identical with the exception that the surfaces of the carbon fibers do not include an amine-functionalized polymer.

34. The fiber reinforced composite of embodiments 36 to 33, wherein the resin is selected from the group consisting of epoxy based resins, bismaleimide based resins, cyanate ester based resins, and phenolic based resins.

35. The fiber reinforced composite of any one or more of embodiments 26 to 34, wherein the carbon fiber has a tensile strength from about 600 to 1,050 ksi.

36. The fiber reinforced composite of any one or more of embodiments 26 to 35, wherein the wherein the polymer is selected from the group consisting of polyamides, polyetheramides, polyimides, polyamide-imides, polyetherimides, polyethersulfones, and diene-based rubbers.

37. The fiber reinforced composite of anyone or more of embodiments 26 to 36, wherein the polymer is selected from the group consisting of amine-terminated polyimides, amine-terminated polyetherimides, amine-terminated polyether sulfones, amine-terminated diene-based rubbers, and amine-terminated polyamides.

38. The fiber reinforced composite of any one or more of embodiments 26 to 37, wherein, the amino containing end group or amino containing pendant group comprises a primary or secondary amine.

39. The fiber reinforced composite of anyone or more of embodiments 26 to 38, wherein the polymer comprises a nylon, para-aramids, meta-aramids, or a combination thereof.

40. The fiber reinforced composite of any one or more of embodiments 26 to 39, wherein the polymer comprises the polymer of any one or more of embodiments 2 to 15.

41. An aerospace part comprising the fiber reinforced composite of anyone of embodiments 26 to 40.

42. A method of preparing a composite carbon fiber according to any one of the preceding embodiments, the method comprising:
passing a carbon fiber through a bath comprising an amino containing polymer, the amino containing polymer comprising an amino containing end group or amino containing pendant group of the polymer;
applying an electro-potential to the cell; and
electrografting the amine containing polymer onto the carbon fiber to produce a composite carbon fiber having a polymer electro-grafted onto a surface thereof via a covalent bond between the carbon fiber surface and the amino containing end group or amino containing pendant group.

43. The method of embodiment 42, wherein the polymer comprises the polymer of any one or more of embodiments 2 to 15.

44. The method of embodiments 42 or 43, wherein the polymer is selected from the group consisting of polyamides, polyetheramides, polyimides, polyamide-imides, polyetherimides, polyethersulfones, and diene-based rubbers.

45. The method of one or more of embodiments 42 to 44, wherein the polymer is selected from the group consisting of amine-terminated polyimides, amine-terminated polyetherimides, amine-terminated polyether sulfones, amine-terminated diene-based rubbers, and amine-terminated polyamides.

46. The method of one or more of embodiments 42 to 45, wherein the amino containing end group or amino containing pendant group comprises a primary or secondary amine.

47. The method of one or more of embodiments 42 to 46, wherein the polymer comprises a nylon, para-aramids, meta-aramids, or a combination thereof.

48. The method of one or more of embodiments 42 to 46, wherein the polymer comprises a polyether block amide (PEBA) that is functionalized to include a terminal or pendant amino containing group.

49. The method of one or more of embodiments 42 to 46, wherein the polymer comprises a polyimide.

50. The method of one or more of embodiments 42 to 46, wherein the polymer has the formula:

Formula (III)

and n is a number from about 2 to 500.

51. The method of one or more of embodiments 42 to 46, wherein the polymer has the formula:

Formula (IV)

and n is a number from about 2 to 500.

52. The method of one or more of embodiments 42 to 46, wherein the polymer comprises a polyetherimides having the general formula:

Formula (V)

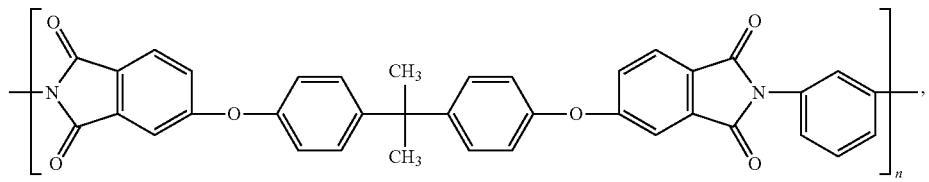

and n is a number from about 2 to 500.

53. The method of one or more of embodiments 42 to 46, wherein the polymer comprises a polyamide-imides having the general formula:

Formula (VI)

and n is a number from about 2 to 500.

54. The method of one or more of embodiments 42 to 46, wherein the polymer comprises an amino terminated sulfone polymers having the general formula aryl-SO₂-aryl.

55. The method of one or more of embodiments 42 to 46, wherein the polymer has the formula Formula (VII)

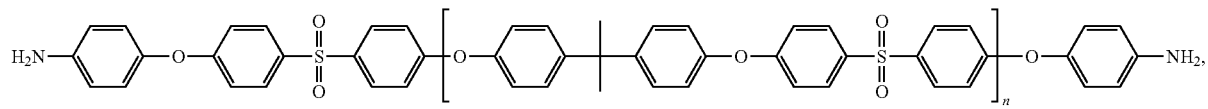

where n is a number from about 2 to 500.

56. The method of one or more of embodiments 42 to 46, wherein the polymer comprises a diene rubber polymer comprising two or more monomers selected from the group consisting of butadiene, isoprene, acrylates, methacrylates, acrylonitriles, and ethylene-propylene dienes.

57. The method of one or more of embodiments 42 to 46, wherein the polymer has the formula:

Formula (VIII)

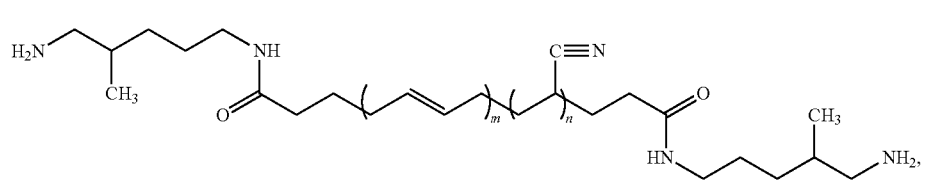

wherein m is a number from about 20 to 100, and n is a number from about 10 to 50.

58. The method of one or more of embodiments 42 to 46, wherein the polymer is selected from the following:

Formula (I)

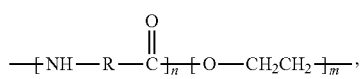

where m and n are independently a number from about 2 to 500, and in particular, from about 10 to 250 and more particularly, from about 10 to 150;

Formula (II)

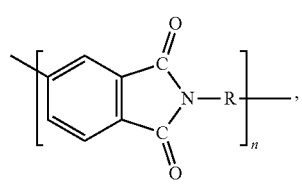

where the polymer backbone is terminated with one or more amino containing groups, contains one or more amino containing pendant groups, or a mixture thereof, R is an alkyl group (C₁-C₁₀), ether, ester, or aryl group; and n is a number from about 2 to 500, and in particular, from about 10 to 150, and more particularly, from about 10 to 30;

Formula (III)

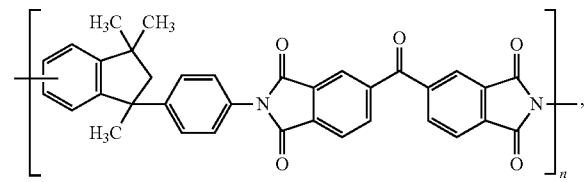

where the polymer backbone is terminated with one or more amino containing groups, contains one or more amino containing pendant groups, or a mixture thereof, and n is a number from about 2 to 500, and in particular, from about 10 to 250, and more particularly, from about 20 to 150;

Formula (IV)

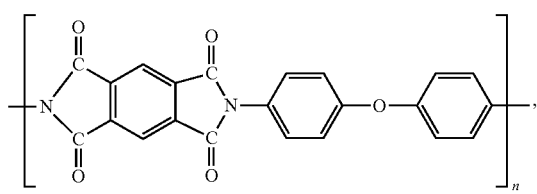

where the polymer backbone is terminated with one or more amino containing groups, contains one or more amino containing pendant groups, or a mixture thereof, and n is a number from about 2 to 500, and in particular, from about 10 to 10, and more particularly, from about 10 to 50;

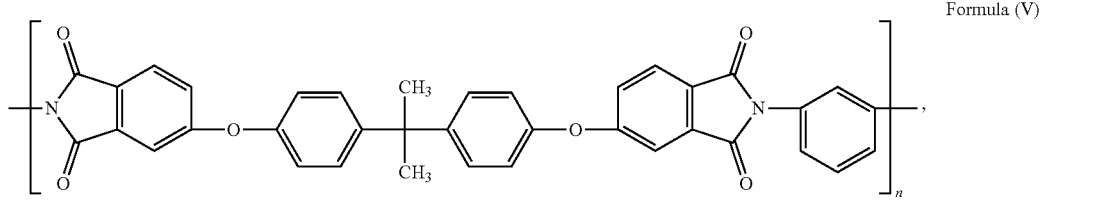

Formula (V)

where the polymer backbone is terminated with one or more amino containing groups, contains one or more amino containing pendant groups, or a mixture thereof, and n is a number from about 2 to 500, and in particular, from about 10 to 100, and more particularly, from about 10 to 50;

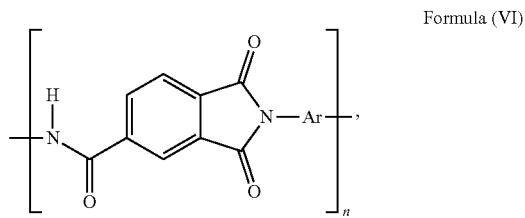

Formula (VI)

where the polymer backbone is terminated with one or more amino containing groups, contains one or more amino containing pendant groups, or a mixture thereof, and n is a number from about 2 to 500, and in particular, from about 10 to 100, and more particularly, from about 10 to 50;

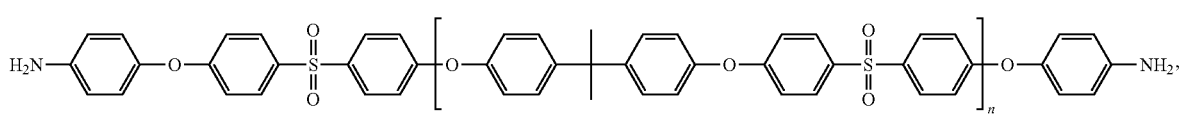

Formula (VII)

where the polymer backbone is terminated with one or more amino containing groups, contains one or more amino containing pendant groups, or a mixture thereof, and n is a number from about 2 to 500, and in particular, from about 10 to 100, and more particularly, from about 10 to 50; and

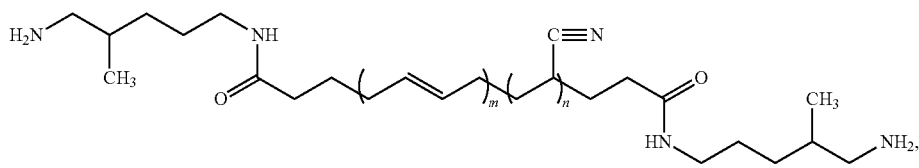

Formula (VIII)

and m is a number from about 20 to 100, and n is a number from about 10 to 50.

59. The method of any one or more of embodiments 42 to 58, wherein the amount of polymer covalently attached to the surface of the carbon fiber is from about 0.05 to 3 weight percent, based on the total weight of the composite carbon fiber.

60. The method of any one or more of embodiments 42 to 59, wherein the amount of polymer covalently attached to the surface of the carbon fiber is from about 0.1 to 0.5 weight percent, based on the total weight of the composite carbon fiber.

61. The method of anyone or more of embodiments 42 to 59, wherein the carbon fiber has a tensile strength of at least 400 ksi.

62. The method of anyone or more of embodiments 37 to 61, wherein the carbon fiber has a tensile strength from about 600 to 1,050 ksi.

63. The method of any one or more of embodiments 37 to 62, wherein the polymer has a weight average molecular weight ranging from about 5,000 to 35,000.

64. The method of any one or more of embodiments 42 to 63, wherein the polymer only has an amino group at the end of a backbone of the polymer.

65. The method of any one or more of embodiments 42 to 64, wherein the polymer does not include any amino containing pendant groups.

66. The method of any one or more of embodiments 42 to 64, wherein the polymer comprises from about 1 to 20 amino containing pendant groups.

67. The method of any one or more of embodiments 42 to 66, wherein the polymer is electrografted to the surface of the carbon fiber via 1 to 20 amino linkages, and in particular, 1 to 2.

68. The method of any one or more of embodiments 42 to 67, wherein the step of electro-grafting the amine-functionalized polymer onto the carbon fiber lasts for a period of time between 30 seconds and two minutes.

69. The method of any one or more of embodiments 42 to 67, wherein the step of electro-grafting the amine-functionalized polymer onto the carbon fiber lasts for a period of time between 45 seconds and 90 seconds.

The invention claimed is:

1. A composite carbon fiber comprising a carbon fiber having an amino-containing polymer electro-grafted onto a surface thereof via an amino linkage directly from the carbon fiber surface to an amino-containing end group, amino-containing pendant group, amino-containing main group, or combination thereof of the polymer.

2. The composite carbon fiber of claim 1, wherein the polymer is selected from the group consisting of polyamides, polyetheramides, polyimides, polyamide-imides, polyetherimides, polyethersulfones, polyetherethersulfones, and diene-based rubbers.

3. The composite carbon fiber of claim 1, wherein the polymer is selected from the group consisting of amine-terminated polyimides, amine-terminated polyetherimides, amine-terminated polyether sulfones, amine-terminated diene-based rubbers, and amine-terminated polyamides.

4. The composite carbon fiber of claim 1 wherein the amino-containing end group or amino-containing pendant group comprises a primary or secondary amine.

5. The composite carbon fiber of claim 1, wherein the polymer comprises a polyether block amide (PEBA) that is functionalized to include a terminal or pendant amino-containing group.

6. The composite carbon fiber of claim 1, wherein the polymer comprises a polyimide.

7. The composite carbon fiber of claim 1, wherein the polymer comprises an amino-terminated sulfone polymer having the general formula aryl-SO$_2$-aryl.

8. The composite carbon fiber of claim 7, wherein the polymer has the formula

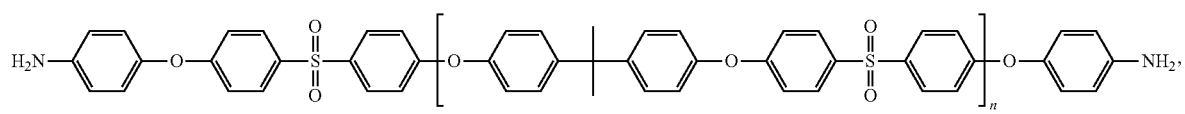

where n is a number from about 2 to 500.

9. The composite carbon fiber of claim 1, wherein the polymer comprises a diene rubber polymer comprising two or more monomers selected from the group consisting of butadiene, isoprene, acrylates, methacrylates, acrylonitriles, and ethylene-propylene dienes.

10. The composite carbon fiber of claim 1, wherein the polymer is selected from the following:

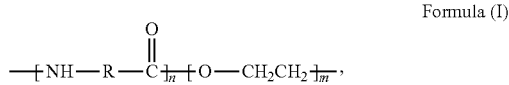

Formula (I)

where m and n are independently a number from about 2 to 500;

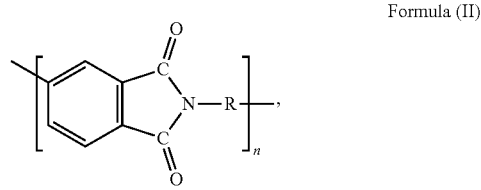

Formula (II)

where the polymer backbone is terminated with one or more amino-containing groups, contains one or more amino-containing pendant groups, or a mixture thereof, R is an alkyl group ($C_1$-$C_{10}$), ether, ester, or aryl group; and n is a number from about 2 to 500;

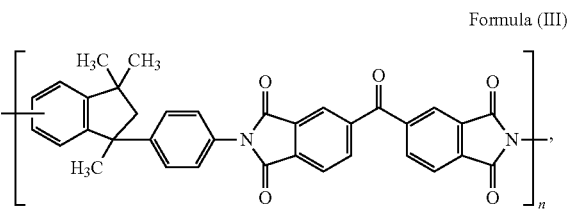

Formula (III)

where the polymer backbone is terminated with one or more amino-containing groups, contains one or more amino-containing pendant groups, or a mixture thereof, and n is a number from about 2 to 500;

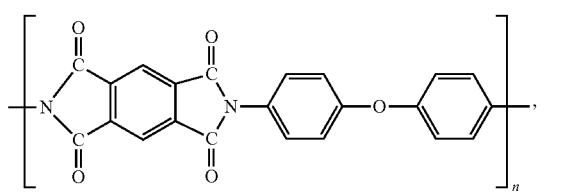

Formula (IV)

where the polymer backbone is terminated with one or more amino-containing groups, contains one or more amino-containing pendant groups, or a mixture thereof, and n is a number from about 2 to 500;

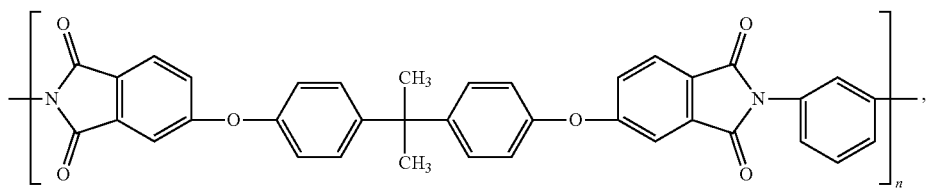

Formula (V)

where the polymer backbone is terminated with one or more amino-containing groups, contains one or more amino-containing pendant groups, or a mixture thereof, and n is a number from about 2 to 500;

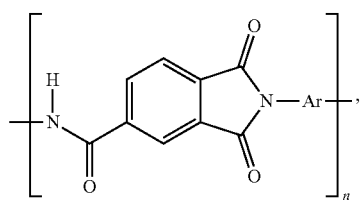

Formula (VI)

where the polymer backbone is terminated with one or more amino-containing groups, contains one or more amino-containing pendant groups, or a mixture thereof, and n is a number from about 2 to 500;

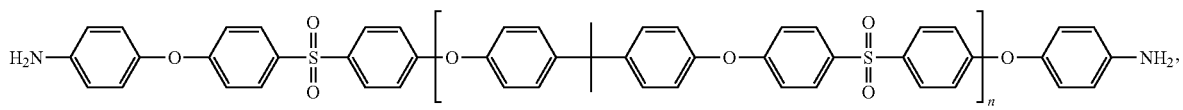

Formula (VII)

where the polymer backbone is terminated with one or more amino-containing groups, contains one or more amino-containing pendant groups, or a mixture thereof, and n is a number from about 2 to 500; and

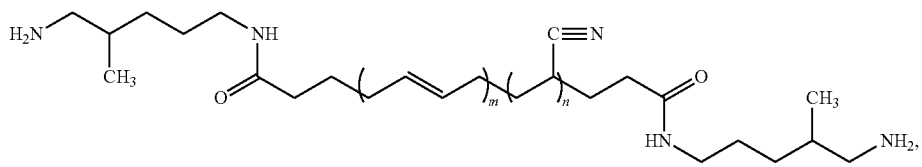

Formula (VIII)

where m is a number from about 20 to 100, and n is a number from about 10 to 50.

11. The composite carbon fiber of claim 1, wherein the amount of polymer covalently attached to the surface of the carbon fiber is from about 0.05 to 3 weight percent, based on the total weight of the composite carbon fiber.

12. The composite carbon fiber of claim 1, wherein the amount of polymer covalently attached to the surface of the carbon fiber is from about 0.1 to 0.5 weight percent, based on the total weight of the composite carbon fiber.

13. The composite carbon fiber of claim 1, wherein the polymer only has an amino group at the end of a backbone of the polymer, and the polymer does not include any amino-containing pendant groups.

14. A fiber reinforced composite comprising a plurality of carbon fibers, wherein each carbon fiber has an amino-containing polymer electro-grafted onto a surface thereof via an amino-containing end group or amino-containing pendant group of the polymer, and a resin matrix infused into the plurality of carbon fibers, wherein the fiber reinforced composite when cured exhibits an increase in fracture toughness from about 10 to 60% in comparison to an identical fiber reinforced composite with the exception that the surfaces of the plurality of carbon fibers do not include an amine-containing polymer electrografted to the surface of the plurality of carbon fibers.

15. The fiber reinforced composite according to claim 14, wherein the fiber reinforced composite when cured exhibits an interlaminar strength of about 17 to 25 ksi as characterized by Short Beam Shear (SBS) testing.

16. The fiber reinforced composite of claim 14, wherein the resin is selected from the group consisting of epoxy based resins, bismaleimide based resins, cyanate ester based resins, and phenolic based resins.

17. The fiber reinforced composite of claim 14, wherein the polymer is selected from the group consisting of polyamides, polyetheramides, polyimides, polyamide-imides, polyetherimides, polyethersulfones, and diene-based rubbers.

18. The fiber reinforced composite of claim 14, wherein the polymer is selected from the group consisting of the following:

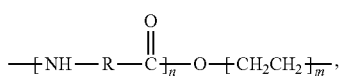

Formula (I)

where m and n are independently a number from about 2 to 500;

Formula (II)

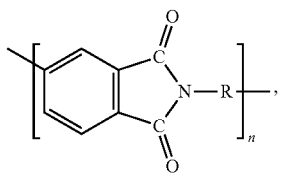

where the polymer backbone is terminated with one or more amino-containing groups, contains one or more amino-containing pendant groups, or a mixture thereof, R is an alkyl group ($C_1$-$C_{10}$), ether, ester, or aryl group; and n is a number from about 2 to 500;

Formula (III)

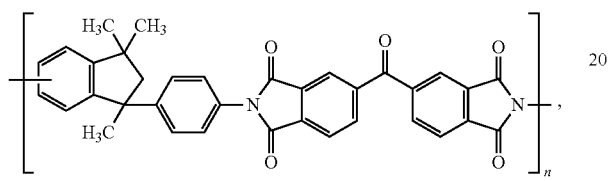

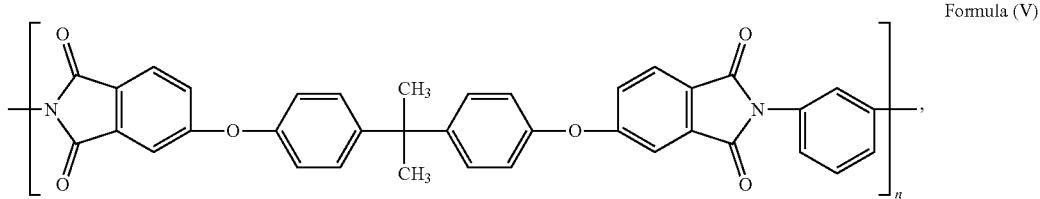

Formula (IV)

where the polymer backbone is terminated with one or more amino-containing groups, contains one or more amino-containing pendant groups, or a mixture thereof, and n is a number from about 2 to 500;

Formula (V)

where the polymer backbone is terminated with one or more amino-containing groups, contains one or more amino-containing pendant groups, or a mixture thereof, and n is a number from about 2 to 500;

Formula (VI)

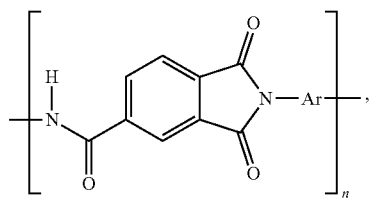

where the polymer backbone is terminated with one or more amino-containing groups, contains one or more amino-containing pendant groups, or a mixture thereof, and n is a number from about 2 to 500;

Formula (VII)

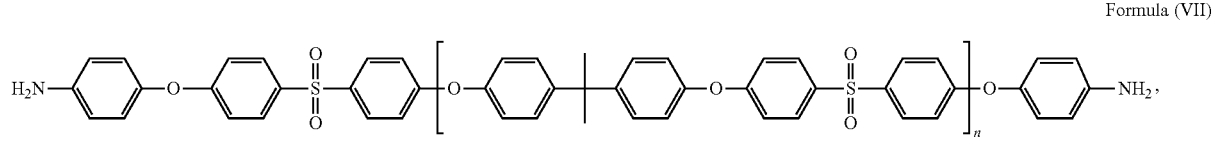

where the polymer backbone is terminated with one or more amino-containing groups, contains one or more amino-containing pendant groups, or a mixture thereof, and n is a number from about 2 to 500; and

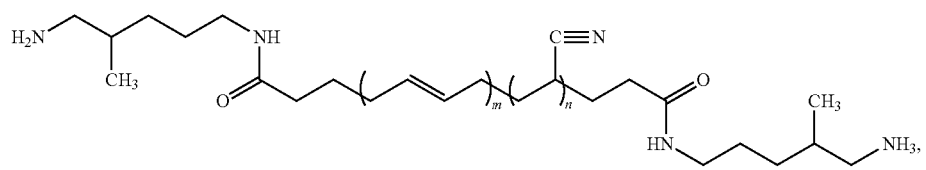

Formula (VIII)

where m is a number from about 20 to 100, and n is a number from about 10 to 50.

19. An aerospace part comprising the fiber reinforced composite of claim 14.

20. A method of preparing a composite carbon fiber, the method comprising:

passing a carbon fiber through a bath comprising an amino-containing polymer, the amino-containing polymer comprising an amino-containing end group or amino-containing pendant group of the polymer;

applying an electro-potential to the cell; and electrografting the amine-containing polymer onto the carbon fiber to produce a composite carbon fiber having a polymer electro-grafted onto a surface thereof via a covalent bond directly from the carbon fiber surface to the amino-containing end group or amino-containing pendant group.

21. The method of claim 20, wherein the polymer is selected from the group consisting of polyamides, polyetheramides, polyimides, polyamide-imides, polyetherimides, polyethersulfones, and diene-based rubbers.

22. The method of claim 20, wherein the polymer is selected from the following:

Formula (I)

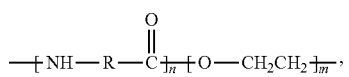

where m and n are independently a number from about 2 to 500;

Formula (II)

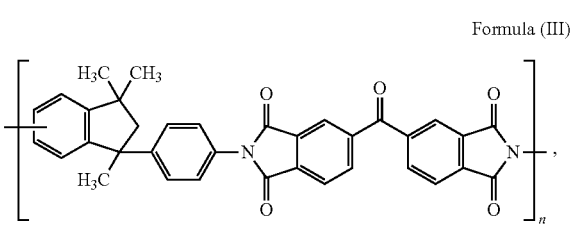

where the polymer backbone is terminated with one or more amino-containing groups, contains one or more amino-containing pendant groups, or a mixture thereof, R is an alkyl group ($C_1$-$C_{10}$), ether, ester, or aryl group; and n is a number from about 2 to 500;

Formula (III)

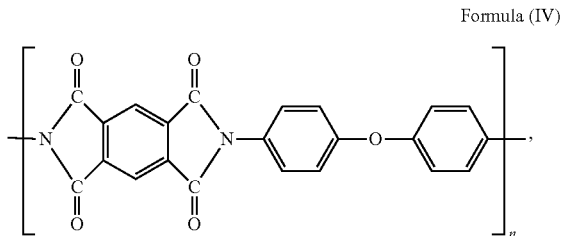

where the polymer backbone is terminated with one or more amino-containing groups, contains one or more amino-containing pendant groups, or a mixture thereof, and n is a number from about 2 to 500;

Formula (IV)

where the polymer backbone is terminated with one or more amino-containing groups, contains one or more amino-containing pendant groups, or a mixture thereof, and n is a number from about 2 to 500;

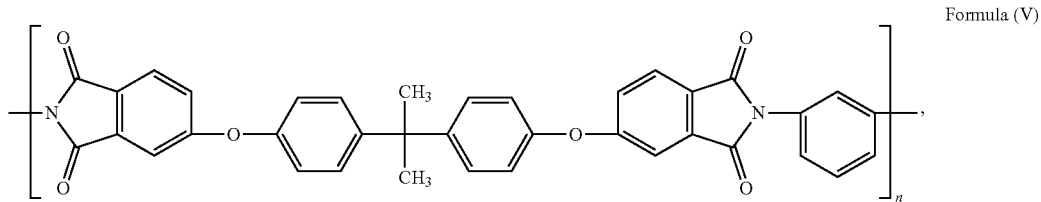

Formula (V)

where the polymer backbone is terminated with one or more amino-containing groups, contains one or more amino-containing pendant groups, or a mixture thereof, and n is a number from about 2 to 500;

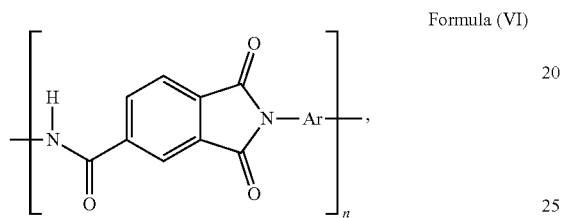

Formula (VI)

where the polymer backbone is terminated with one or more amino-containing groups, contains one or more amino-containing pendant groups, or a mixture thereof, and n is a number from about 2 to 500;

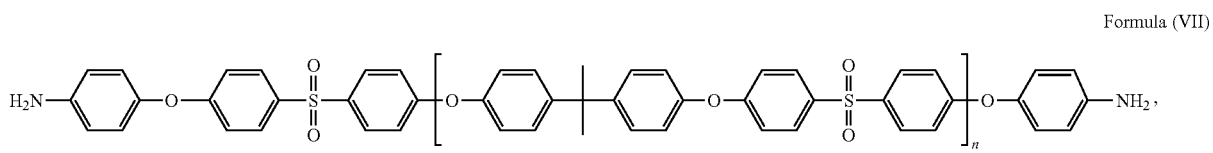

Formula (VII)

where the polymer backbone is terminated with one or more amino-containing groups, contains one or more amino-containing pendant groups, or a mixture thereof, and n is a number from about 2 to 500; and

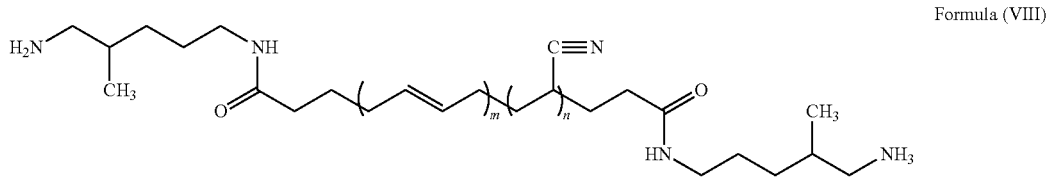

Formula (VIII)

, where m is a number from about 20 to 100, and n is a number from about 10 to 50.

23. The method of claim 20, wherein the amount of polymer covalently attached to the surface of the carbon fiber is from about 0.05 to 3 weight percent, based on the total weight of the composite carbon fiber.

* * * * *